(12) United States Patent
Ertmann et al.

(10) Patent No.: US 10,313,287 B2
(45) Date of Patent: Jun. 4, 2019

(54) METHODS AND SYSTEMS FOR DISPLAYING MESSAGES IN AN ASYNCHRONOUS ORDER

(71) Applicant: Facebook, Inc., Menlo Park, CA (US)

(72) Inventors: Eric Carl Ertmann, San Francisco, CA (US); Charles Donald Deets, Jr., Palo Alto, CA (US); Daniel M Giuditta, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 102 days.

(21) Appl. No.: 15/170,525

(22) Filed: Jun. 1, 2016

(65) Prior Publication Data

US 2017/0353414 A1    Dec. 7, 2017

(51) Int. Cl.
    *G06F 15/16*      (2006.01)
    *H04L 12/58*      (2006.01)

(52) U.S. Cl.
    CPC .............. *H04L 51/16* (2013.01); *H04L 51/32* (2013.01)

(58) Field of Classification Search
CPC combination set(s) only.
See application file for complete search history.

(56) References Cited

U.S. PATENT DOCUMENTS

| | | | |
|---|---|---|---|
| 6,055,639 A * | 4/2000 | Schanze | H04L 9/083 726/10 |
| 6,853,852 B1 * | 2/2005 | Park | H04W 88/181 370/466 |
| 7,016,321 B1 * | 3/2006 | Park | H04W 36/0066 370/230 |
| 7,933,956 B2 | 4/2011 | Hon et al. | |
| 2003/0088623 A1 * | 5/2003 | Kusuda | H04L 12/66 709/204 |
| 2006/0101071 A1 | 5/2006 | Henderson | |
| 2007/0002825 A1 * | 1/2007 | O'Brien | H04L 51/04 370/351 |
| 2008/0137607 A1 * | 6/2008 | Ju | H04W 24/04 370/331 |
| 2009/0044200 A1 | 2/2009 | Bordia et al. | |
| 2010/0161749 A1 * | 6/2010 | Muller | H04L 51/066 709/206 |
| 2011/0265098 A1 | 10/2011 | Dozsa et al. | |
| 2012/0260195 A1 | 10/2012 | Hon et al. | |
| 2013/0160026 A1 | 6/2013 | Kuesel et al. | |
| 2013/0185643 A1 | 7/2013 | Greifeneder et al. | |

(Continued)

*Primary Examiner* — Alan S Chou

(57) ABSTRACT

Exemplary embodiments relate to techniques for introducing asynchronous messaging concepts into a synchronous messaging system. As a conversation is carried out, different topics may be identified and highlighted as separate threads within the conversation. A new thread may be identified based on a number of factors, including (for example) time between messages, questions raised in a communication, discussions of dates, the inclusion of links, and any mentions of specific names. Further embodiments relate to techniques for navigating in asynchronous message threads. For example, a synchronous message alias may be created that redirects a display to a location of an asynchronous message. An indication may be displayed to designate that the asynchronous message is displayed out-of-order.

20 Claims, 26 Drawing Sheets

(56) References Cited

U.S. PATENT DOCUMENTS

| | | | |
|---|---|---|---|
| 2014/0025757 A1* | 1/2014 | Haugen | H04L 51/10 709/206 |
| 2014/0359023 A1* | 12/2014 | Homsany | H04L 51/08 709/206 |
| 2016/0330147 A1 | 11/2016 | Antebi et al. | |
| 2017/0090718 A1 | 3/2017 | Chen et al. | |
| 2017/0103680 A1* | 4/2017 | Campbell | G09B 21/00 |
| 2017/0104866 A1* | 4/2017 | Campbell | H04M 1/72588 |
| 2017/0272388 A1 | 9/2017 | Bern et al. | |

* cited by examiner

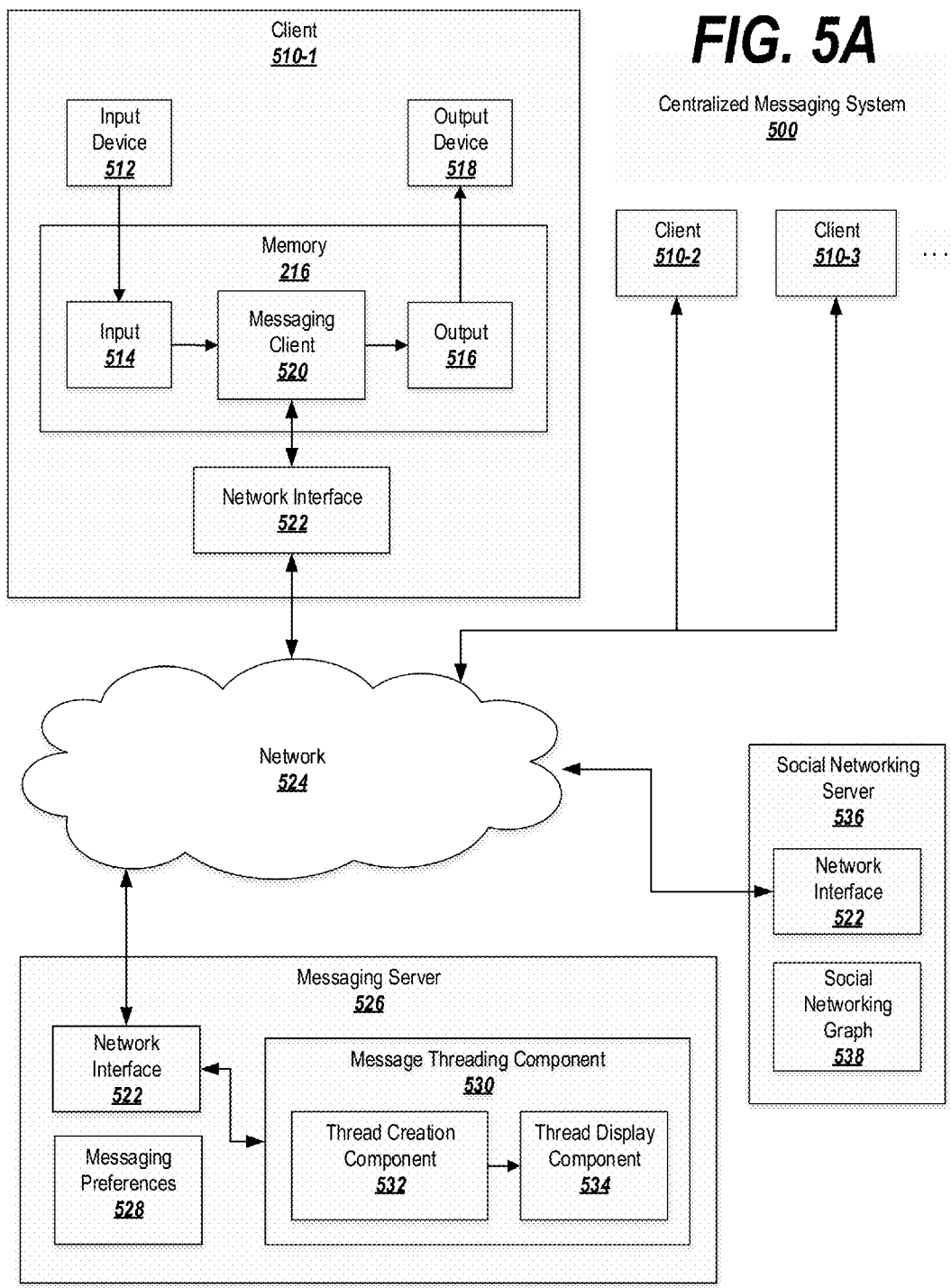

Distributed Messaging System
550

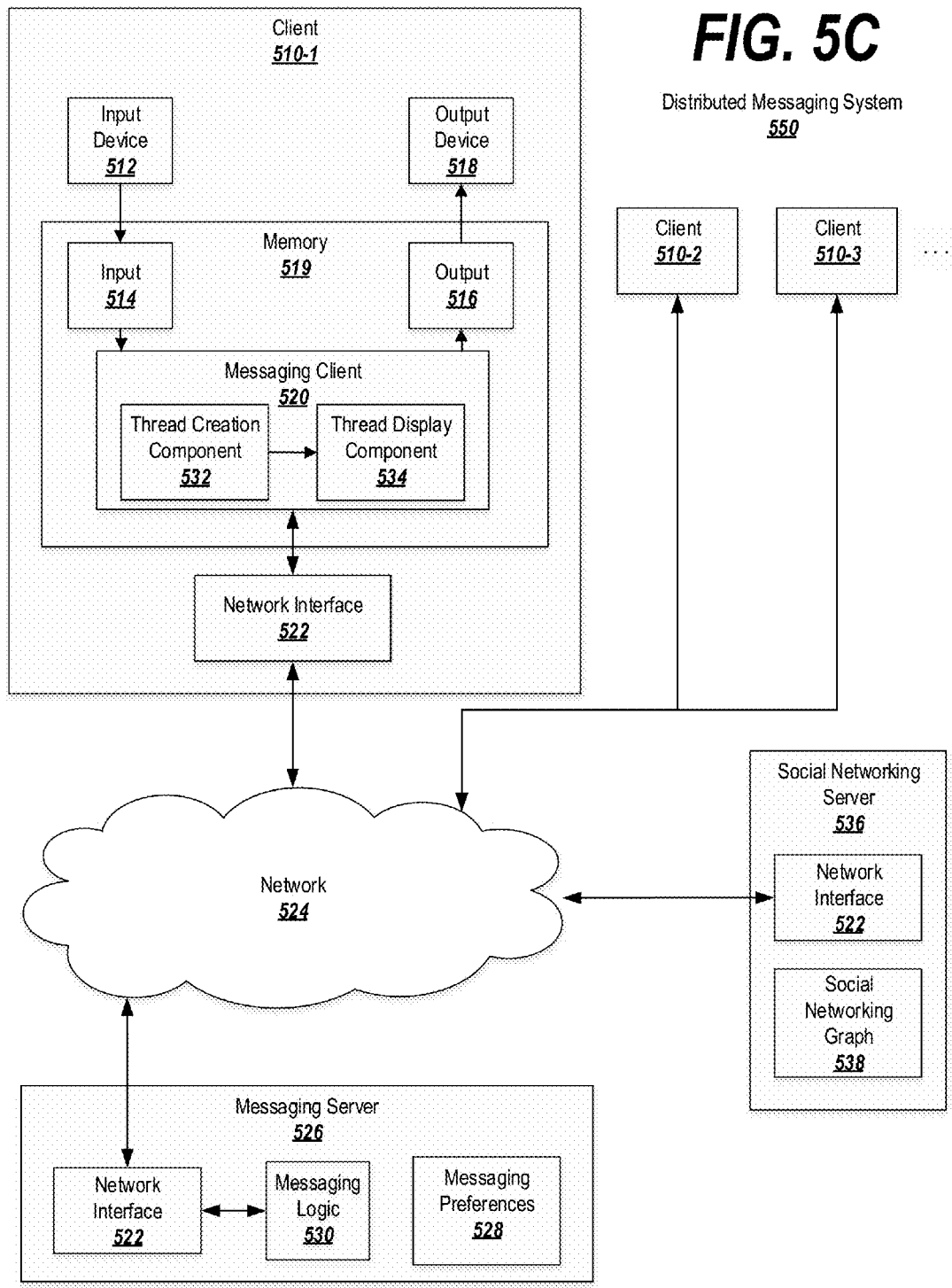

Message Threading Logic
*600*

METHODS AND SYSTEMS FOR DISPLAYING MESSAGES IN AN ASYNCHRONOUS ORDER

BACKGROUND

Messaging systems, such as instant messaging systems and short message service ("SMS") systems, allow users to communicate with each other by exchanging messages. Messaging systems may allow a first user to connect with a second user for communication on a one-to-one basis, or may connect three or more users together in a group. In a group message, messages sent by one member of the group may be visible to all group members.

BRIEF DESCRIPTION OF THE DRAWINGS

FIG. 5A is a block diagram providing an overview of a system including an exemplary centralized messaging service;

FIG. 5C is a block diagram providing an overview of a system in which conversational threading logic is localized at a client device;

DETAILED DESCRIPTION

Figure 1A:
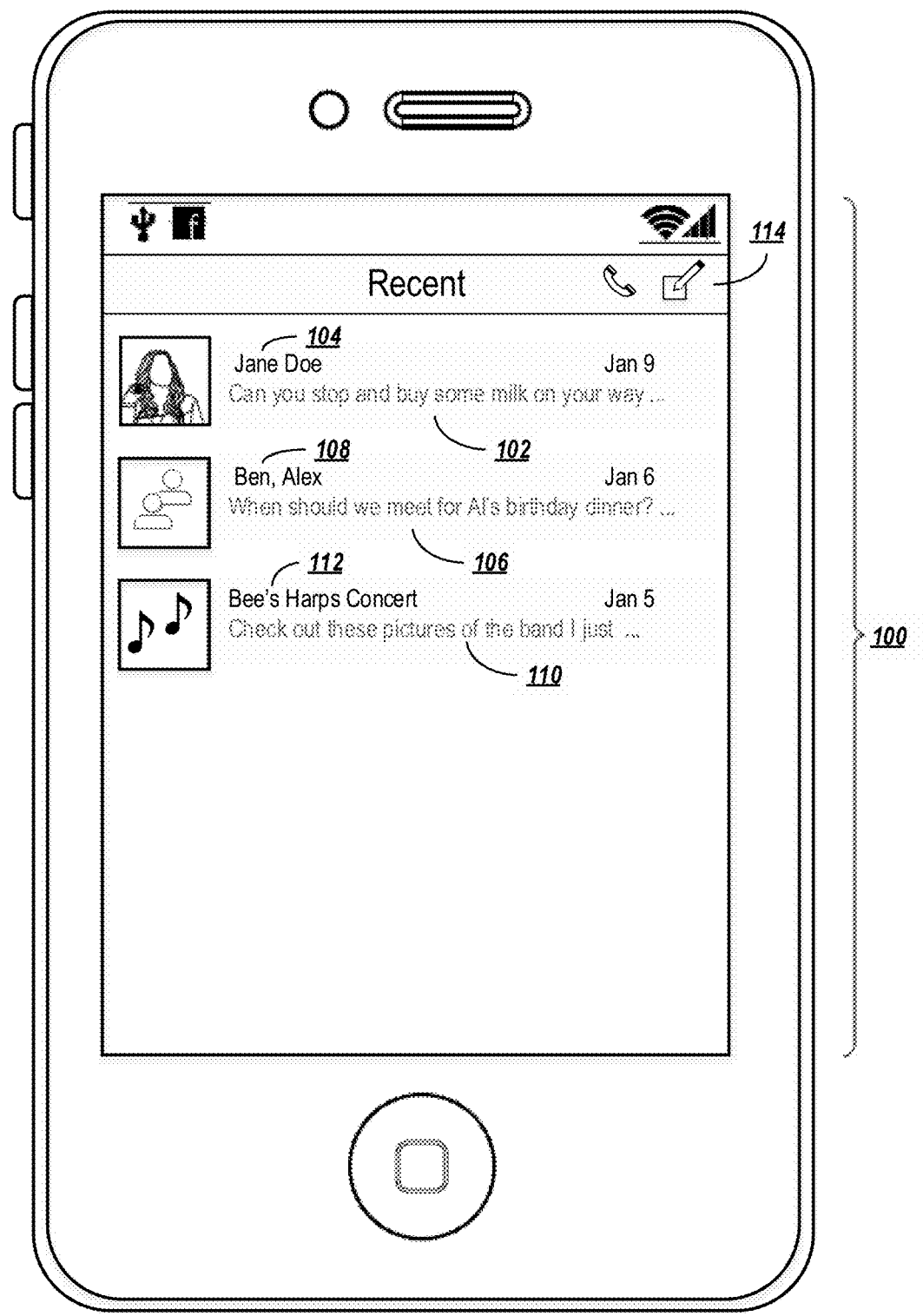
FIG. 1A depicts an exemplary messaging interface including several types of individual and group messages.

Exemplary embodiments described herein pertain to improvements in messaging systems, and in particular address several aspects of expanding traditional synchronous messaging systems to incorporate the ability to display and interact with messages in an asynchronous manner and/or through the use of messaging threads.

Synchronous messaging generally describes a messaging system that maintains a particular order for received messages, e.g. a chronological order. For example, if messages are received in the order {Message 1, Message 2, Message 3}, then a synchronous messaging system may display the messages in the order {Message 1, Message 2, Message 3}. Examples of synchronous messaging systems include traditional SMS systems, in which messages are displayed in the order in which they are received.

Synchronous messaging has limitations, particularly in a group messaging context. For example, some members of the group may be discussing a first topic at the same time that other members of the group are discussing a second topic. When messages are displayed in a synchronous format, it may be unclear as to which messages belong to which topics.

In exemplary embodiments described herein, aspects of asynchronous messaging are employed to create conversational threads. Asynchronous messages include messages that are displayed out-of-order (e.g., out of the chronological order in which the messages were generated or received). For example, if messages are received in the order {Message 1, Message 2, Message 3}, but Message 2 pertains to a different topic than Message 1 and Message 3, then the messages may be displayed as {[Thread 1: Message 1, Message 3], [Thread 2: Message 2]}.

A number of techniques and embodiments are described herein, which may be employed separately or together in any combinations. Among other techniques described herein, exemplary embodiments identify when conversational threads begin and/or end. Messages may be assigned to different conversational threads, and a display may visually distinguish different threads.

As the messages are displayed on a display and the display is changed, different threads may receive focus; alternatively or in addition, a user may manually select a thread for focus. A representative or parent message for the thread may be identified, and the parent message for the focused thread may be displayed in a predetermined location (e.g., pinned to a top of the display).

When a thread is focused, new messages generated by a user may be added to the focused thread. When a synchronous message is displayed in an asynchronous location, a message alias may be displayed at a location at which the message would have appeared in a synchronous view. The alias may include a link to a location of the message in the conversation thread. The (asynchronous) message in the conversation thread may include an indication designating that the message is displayed out-of-order.

When new messages are received, a user may be notified of the new message only if the message creates a new thread, or the message is assigned to a thread with which the user has recently interacted. If the user has not recently interacted with the thread to which the message is assigned, notifications may be suppressed.

The messages may be displayed in a number of different views, including a synchronous view, an asynchronous view in which the messages are organized into threads. In asynchronous view, a summary view may be presented in which only certain messages (e.g., the parent message, or the highlights of the thread) are displayed. The asynchronous view may also include an expanded view in which all messages of the thread(s) are displayed. A user may change between the summary view and the expanded view by using touch gestures.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

Messaging Overview

A general overview of messaging techniques is now described.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
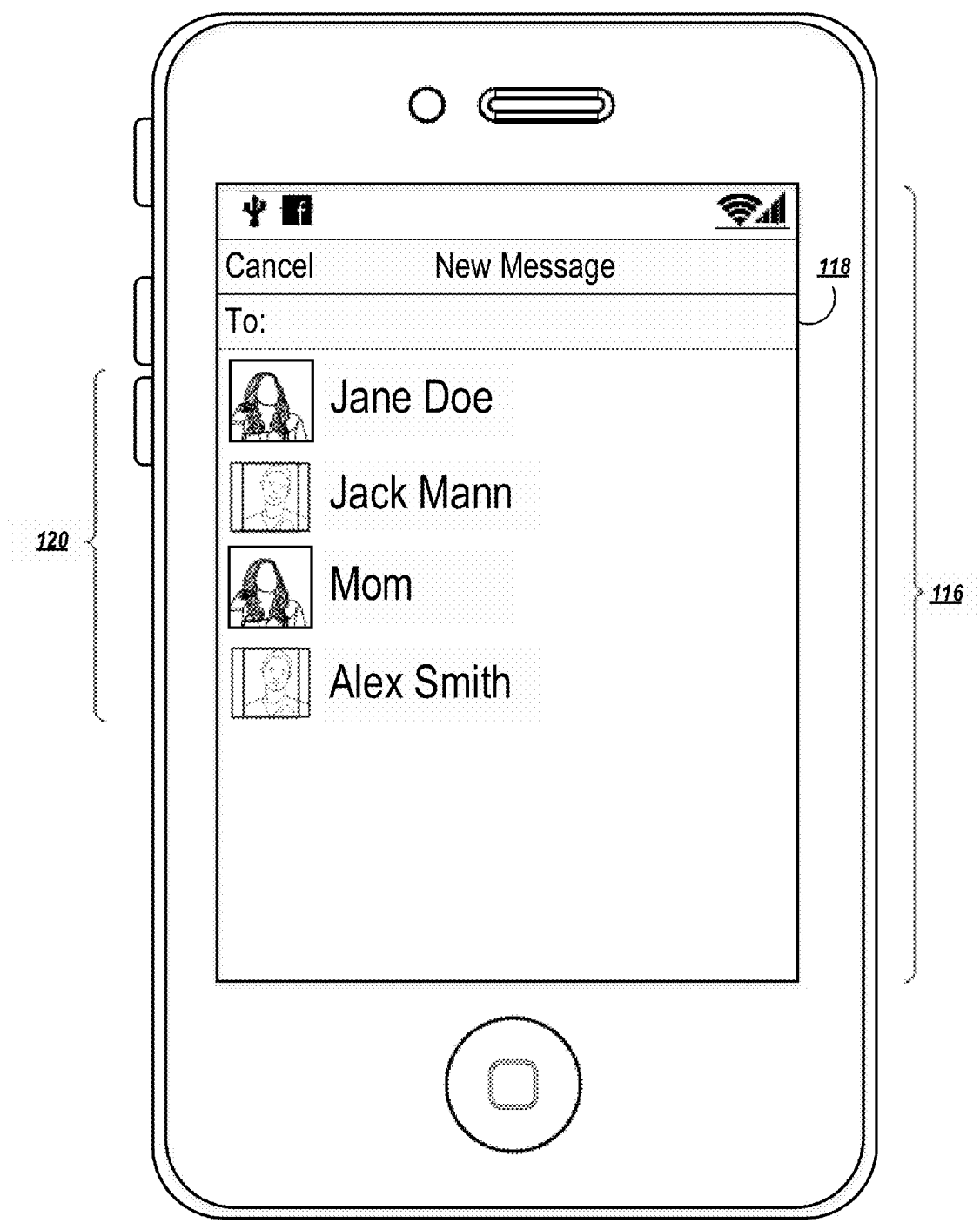
FIG. 1B depicts an exemplary message composition interface.

For example, FIG. 1B depicts an interface 116 displayed by the messaging client application in response to receiving a selection of the "compose" interface element 114. A "new message" window is displayed in the interface 116. The new message window includes a recipient field 118 for allowing the user to manually enter identifiers for one or more recipients. If available, the user's contacts list 120 may also be displayed in the interface 116 in order to simplify the selection of the recipients.

Figure 1C:
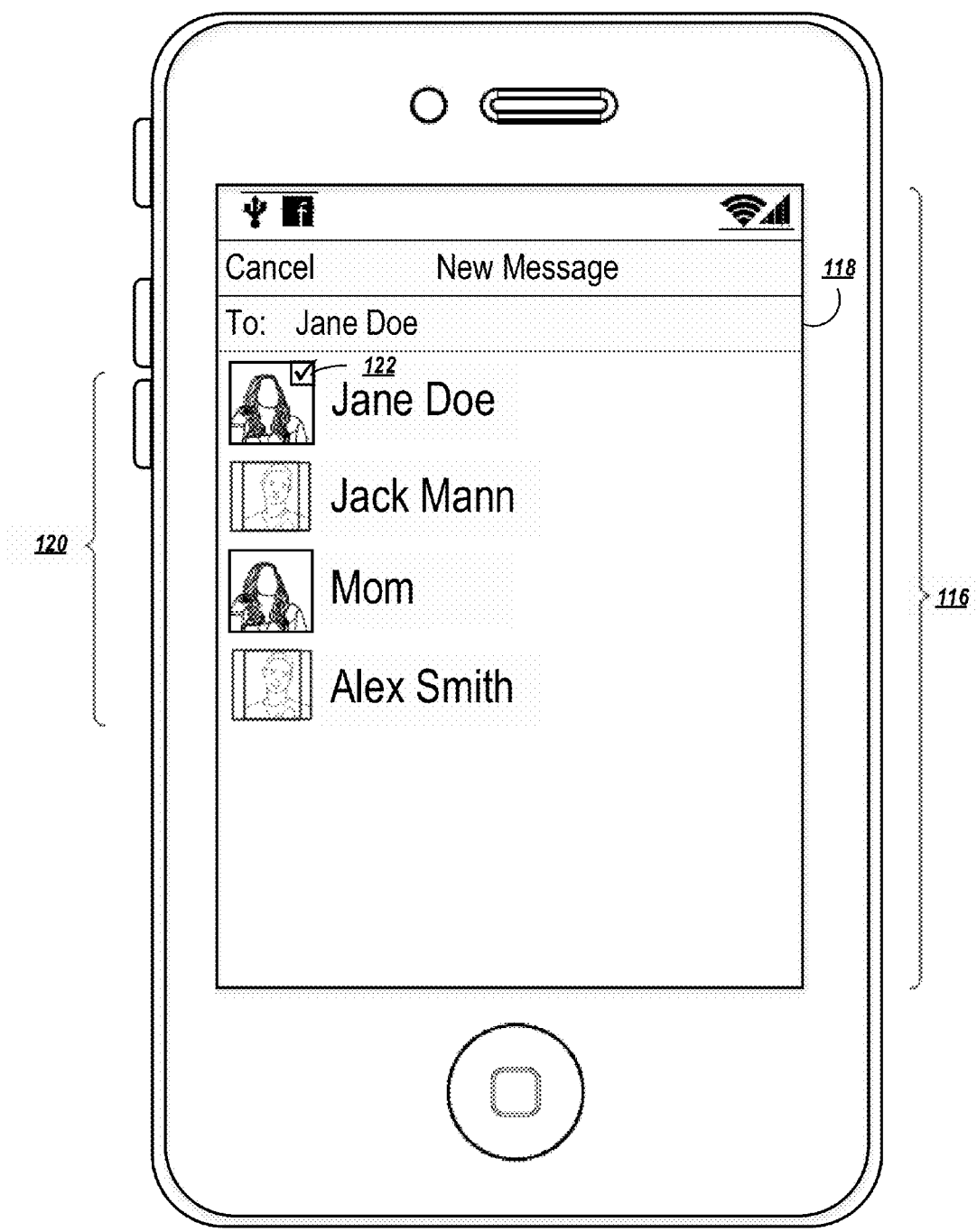
FIG. 1C depicts an example of selecting a recipient of a message in a messaging interface.

In the example of FIG. 1C, the user has entered the identifier of a recipient in the recipient field 118. In order to indicate the recipient's inclusion in the recipients list, a selection indication 122 is displayed on the recipient's icon in the contacts list 120.

Figure 1D:
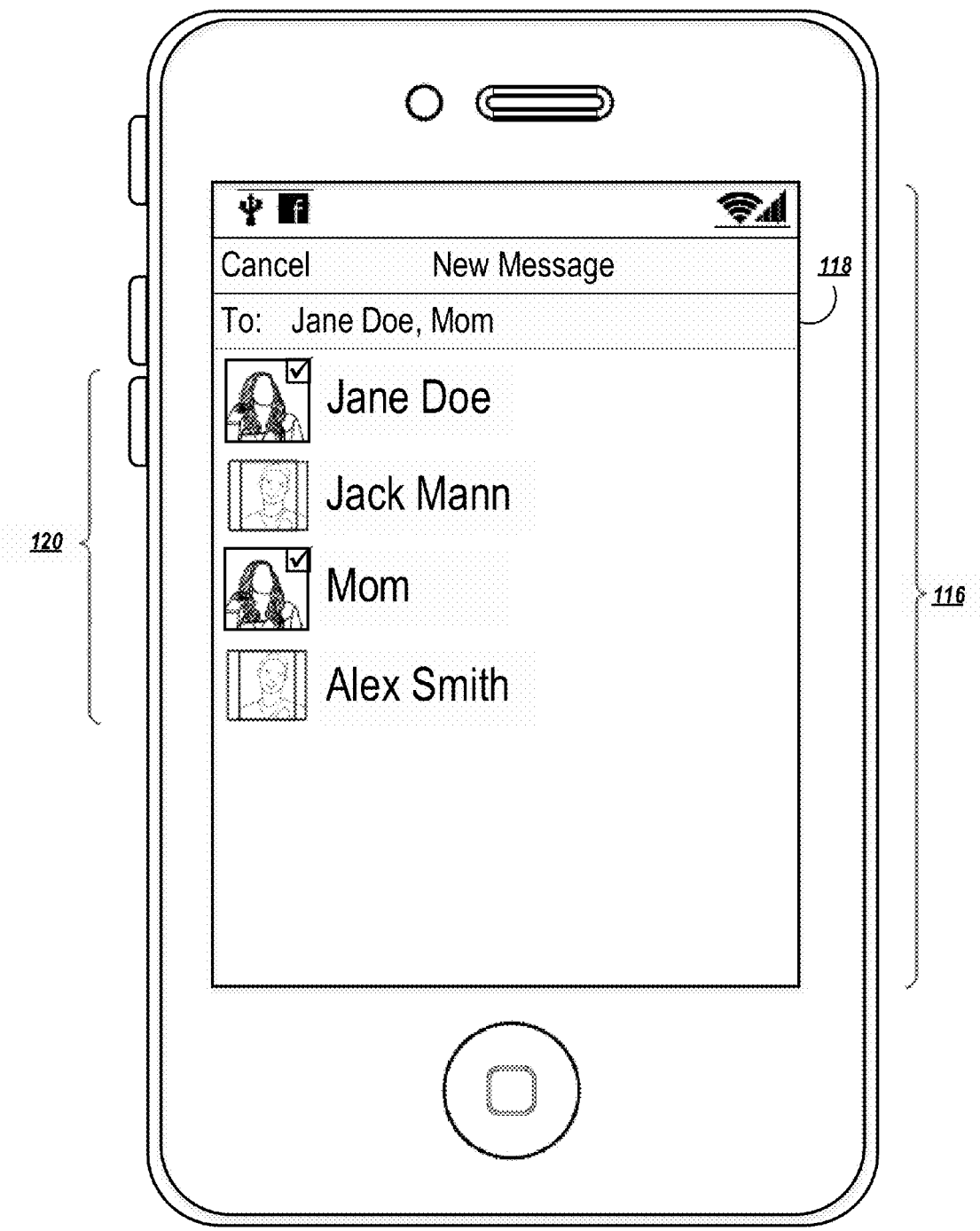
FIG. 1D depicts an example of selecting a group of recipients of a message in a messaging interface.

It is possible to select more than recipient in the interface 116 in order to create a group message, e.g. by manually adding multiple recipients in the recipient filed 118, selecting multiple contacts in the contacts list 120, or a combination of methods. FIG. 1D depicts an example of such a group selection.

According to exemplary embodiments, a messaging system arranges messages in an asynchronous order, and allows users to interact with messages and threads asynchronously. Exemplary embodiments described below are particularly well-suited to applications in group messaging contexts. However, one of ordinary skill in the art will recognize that the present application is not limited to group messages, and may also be applied to one-on-one messages.

Synchronous and Asynchronous Messaging

Figure 2A:
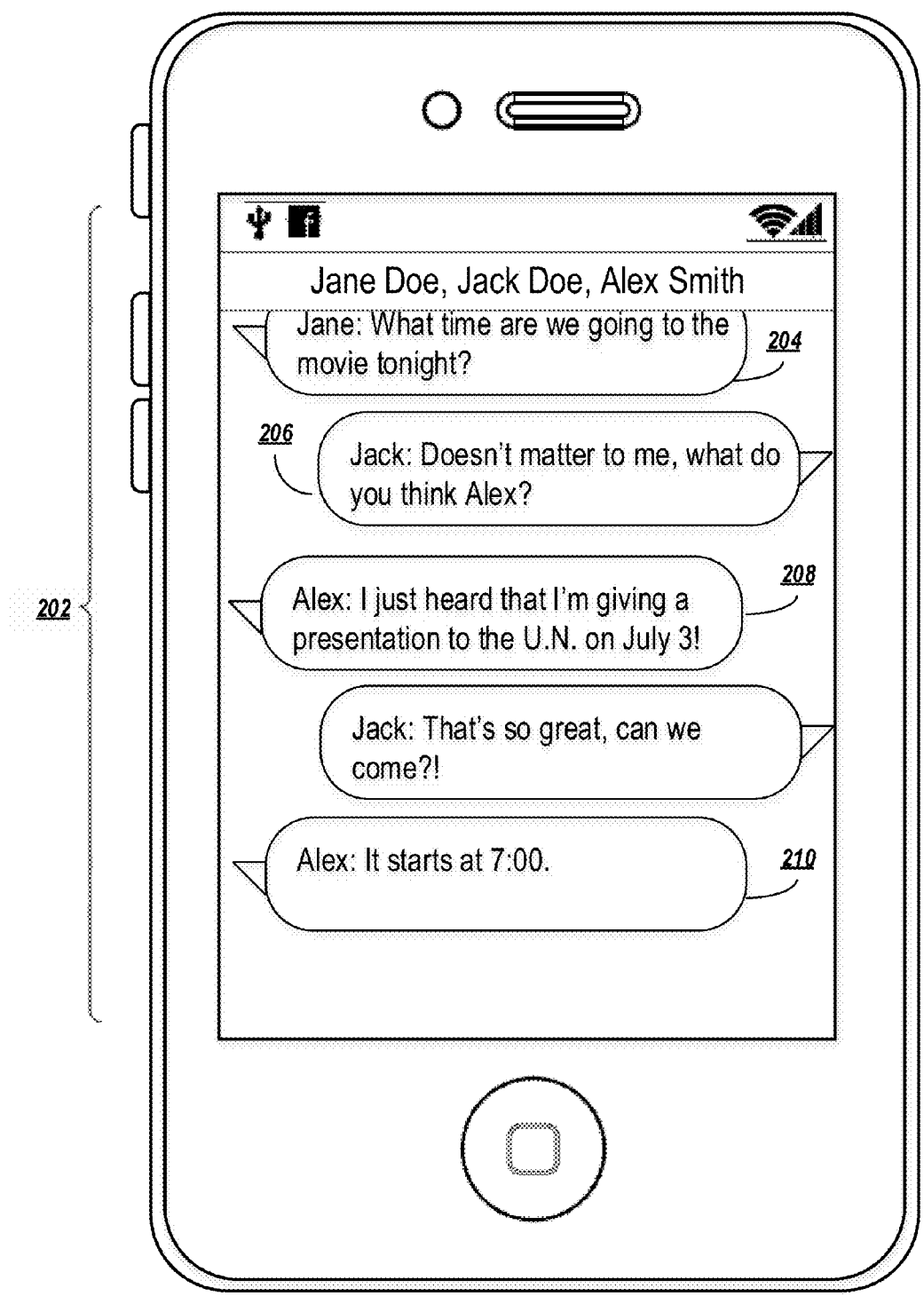
FIG. 2A depicts an example of a synchronous view of a conversation.

FIG. 2A depicts an example of an interface 202 displayed on a client mobile device. In this example, a group conversation is occurring between Jane Doe, Jack Doe, and Alex Smith. Jane Doe, as viewed from the client device of Jack Doe. In this case, Jane Doe transmitted a first message 204 asking "what time are we going to the movie tonight?" Jack Doe followed up with a second message 206 stating "doesn't matter to me, what do you think Alex?" Alex responds with a third message 208 stating "I just heard that I'm giving a presentation to the U.N. on July 3!" After Jack asks whether he and Jane can come to see the presentation, Alex responds "it starts at 7:00."

This sequence of messages shows how a single group conversation can include multiple conversation threads. In this case, messages 204 and 206 relate to an upcoming plan for Jane, Jack, and Alex to see a movie, whereas the third message 206 introduces a new chain of thought.

This example also demonstrates how conventional synchronous communication can become confusing. Alex's message 210 indicates that "it" starts at 7:00, but it is unclear whether this is in response to the second message 206 where Jack asks for Alex's opinion on the movie time, or Jack's subsequent question of whether Jack and Jane can watch Alex's U.N. presentation. Without a way to distinguish between different conversational threads, Jack cannot be sure whether Alex wishes to see a movie that starts at 7:00, or whether Alex's U.N. presentation begins at 7:00.

Figure 2B:
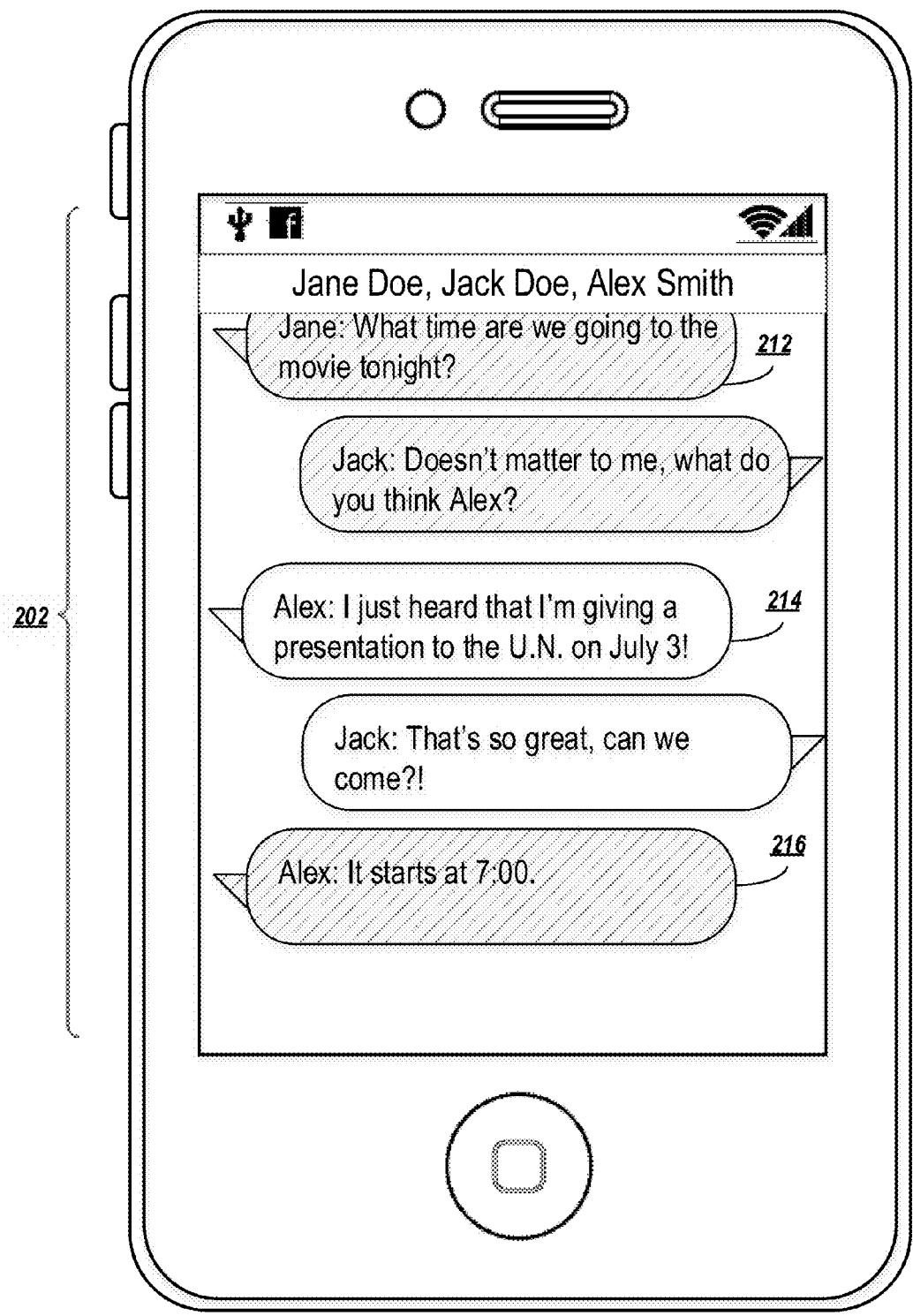
FIG. 2B depicts an example of visually distinguishing different conversation threads.

FIG. 2B depicts an example in which the messages continue to be displayed synchronously, but are organized into threads. Different threads are visually distinguished from each other, while different messages from the same thread are visually distinguished in the same way. For example, a first thread may be displayed in one color, whereas a second thread may be displayed in a second color. One of ordinary skill in the art will recognize that there are numerous other ways to visually distinguish two threads, including changes in typeface, the inclusion of identifying icons or characters, changing the borders of the messages, changing the sizes of the messages, etc. In this example, Jane's original message serves as the parent message 212 for a first thread, which is visually distinguished with grey cross-hatching. Alex's original message serves as the parent message 214 for a second thread.

In this case, Alex's response message 216 has been flagged as a member of the first thread, making it clear that Alex was responding to Jack's question about movie times, not setting a time for his U.N. presentation.

Figure 2C:
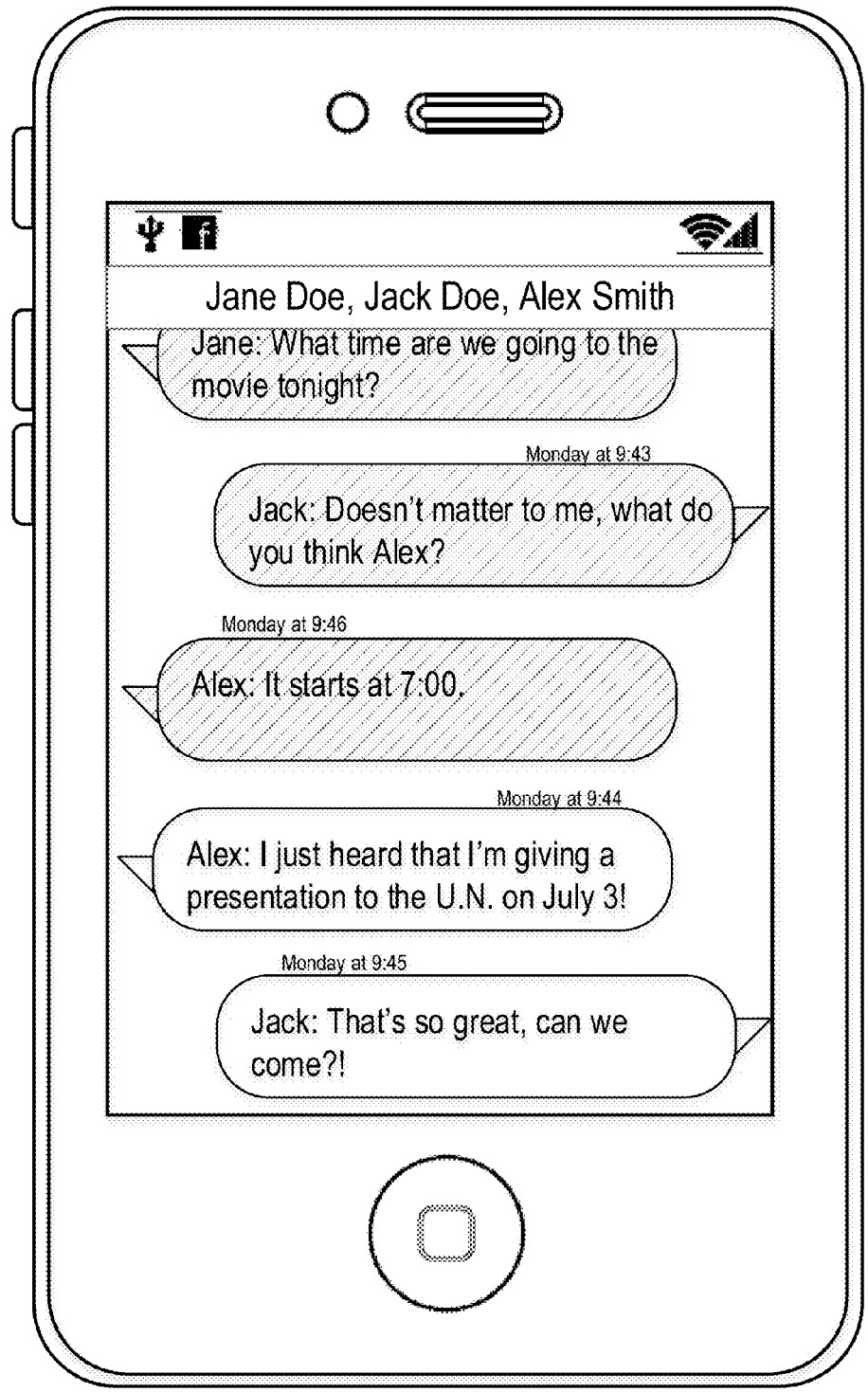
FIG. 2C depicts an alternative view in which messages of the conversation threads are displayed asynchronously.

Alternatively or in addition, the messages may be displayed out-of-order (asynchronously), as shown in FIG. 2C. In this example, the messages have been rearranged as compared to the original order in which the messages were composed/received. The messages are now grouped so that messages from the same thread are displayed together. Messages may be displayed synchronously within their own thread, although they may be displayed asynchronously with respect to the conversation as a whole (as is the case in the example of FIG. 2C).

This brief summary is intended to serve as a non-limiting introduction to the concepts of organizing conversations into thread and organizing messages asynchronously. These concepts will be described in more detail in connection with FIGS. 3A-8. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of a messaging system is now provided Threaded and/or Asynchronous Conversations FIGS. 3A-4B provide various examples of creating threaded and/or asynchronous conversations and interacting with message threads.

Figure 3A:
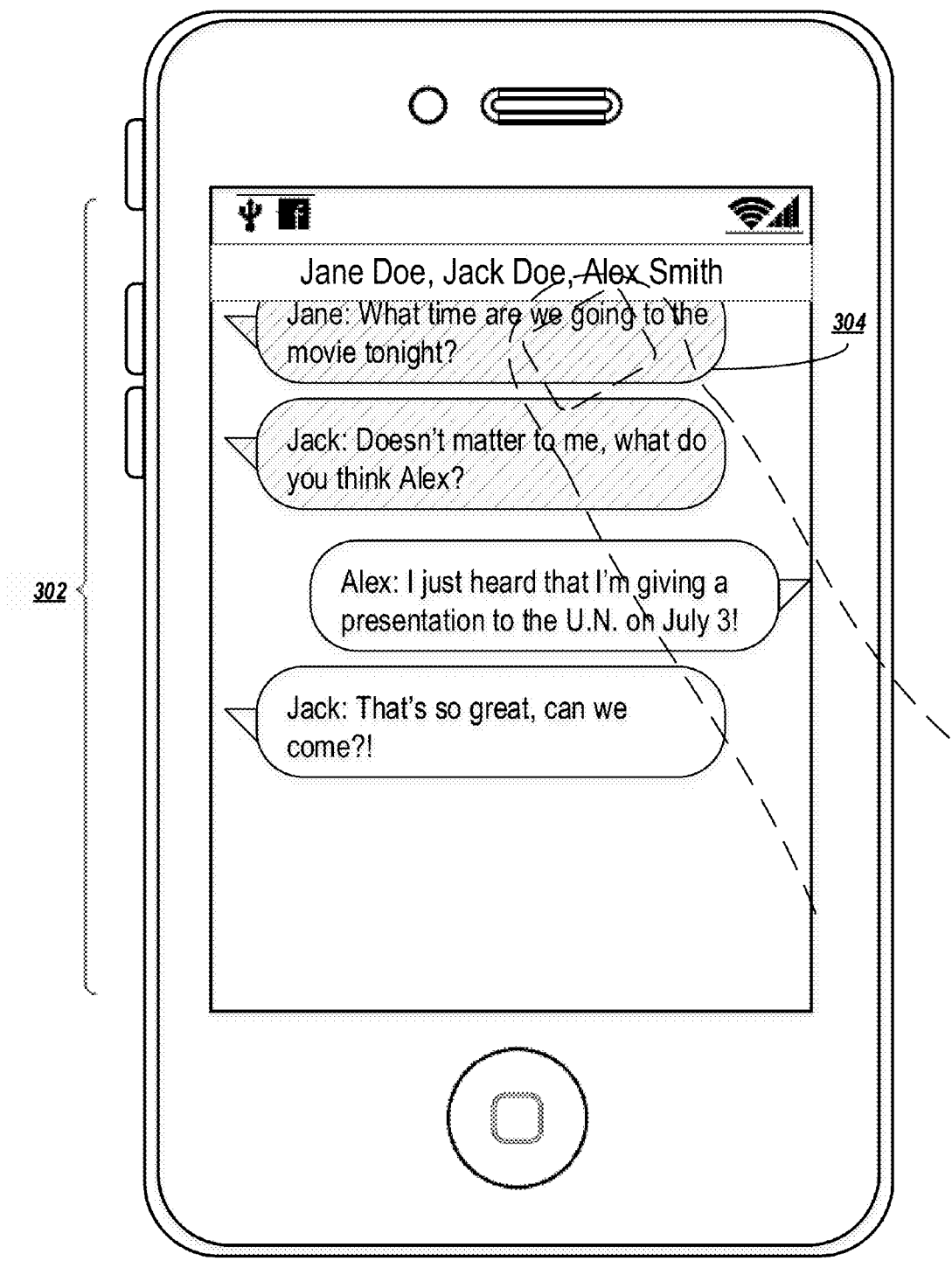
FIG. 3A depicts an example of selecting a conversation thread to receive focus.

FIG. 3A depicts an example of a mobile device interface 302 as viewed on the user Alex Smith's mobile device. The interface 302 depicts a conversation between Alex and the users Jack and Jane. In this case, the conversation includes two threads, which are visually distinguished from each other by coloring the thread messages differently. The first thread includes a parent message 304 that represents the start of the thread (in this example; in other examples, the parent message may be the most representative message of the thread, the most responded-to message of the thread, etc).

FIG. 3A depicts a user selecting the first thread by interacting with the parent message 304 of the thread (in this case, the user selects the parent message 304 with a finger tap on a touch-sensitive display). Once the thread is selected, the messaging system maintains the selected thread "in focus" so that future interactions, such as sending new messages, are associated with the selected thread.

A thread may be selected to become the in-focus thread in other ways as well. For example, as a user scrolls, the messaging system may determine which thread includes the most currently-visible messages on the interface, or takes up the most space on the currently viewed interface. The most-visible thread may be automatically selected as the in-focus thread.

Figure 3B:
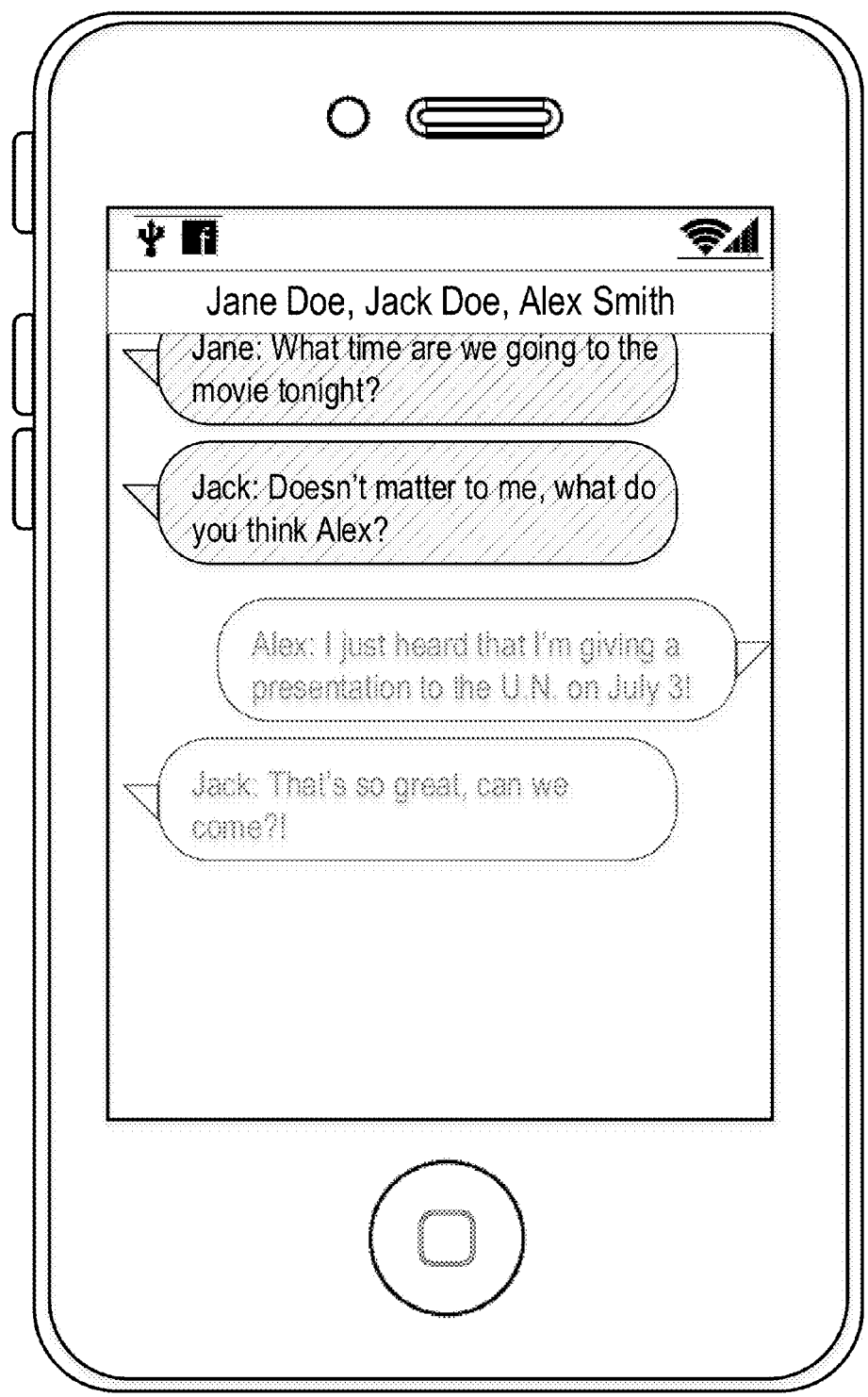
FIG. 3B depicts an example of visually distinguishing a focused conversation thread.

In FIG. 3B threads other than the selected thread are made partially transparent, in order to further distinguish the in-focus thread. Although FIG. 3B depicts only two threads (one in-focus and one out-of-focus), it is understood that, if additional out-of-focused threads were present, they would also be made partially transparent.

Figure 3C:
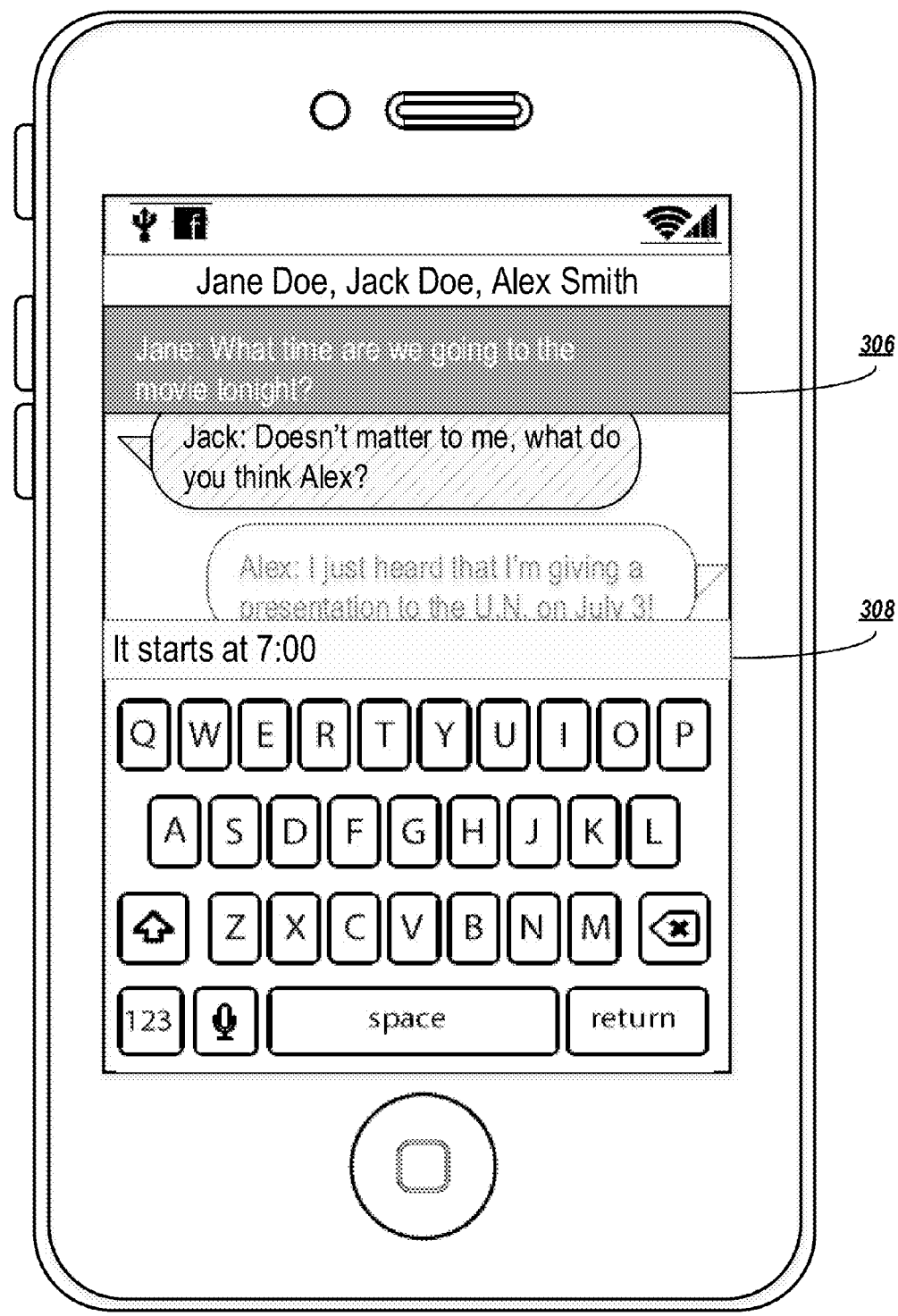
FIG. 3C depicts an example of pinning a parent message of a focused thread and composing a new message to the focused thread.

As the user scrolls the messages on the display, the parent message 304 may be moved off-screen. In order to keep the subject of the thread clear and/or visible at all times, the parent message 304 may be displayed in a predetermined location, as shown in FIG. 3C. In this example, the parent thread is pinned to a predetermined location 306 at the top of the conversation display. If a new thread is brought into focus (e.g., by scrolling the screen so that the currently-selected thread no longer takes up most of the interface), then the parent message of the new in-focus thread may replace the old parent message in the predetermined location 306.

Figure 3D:
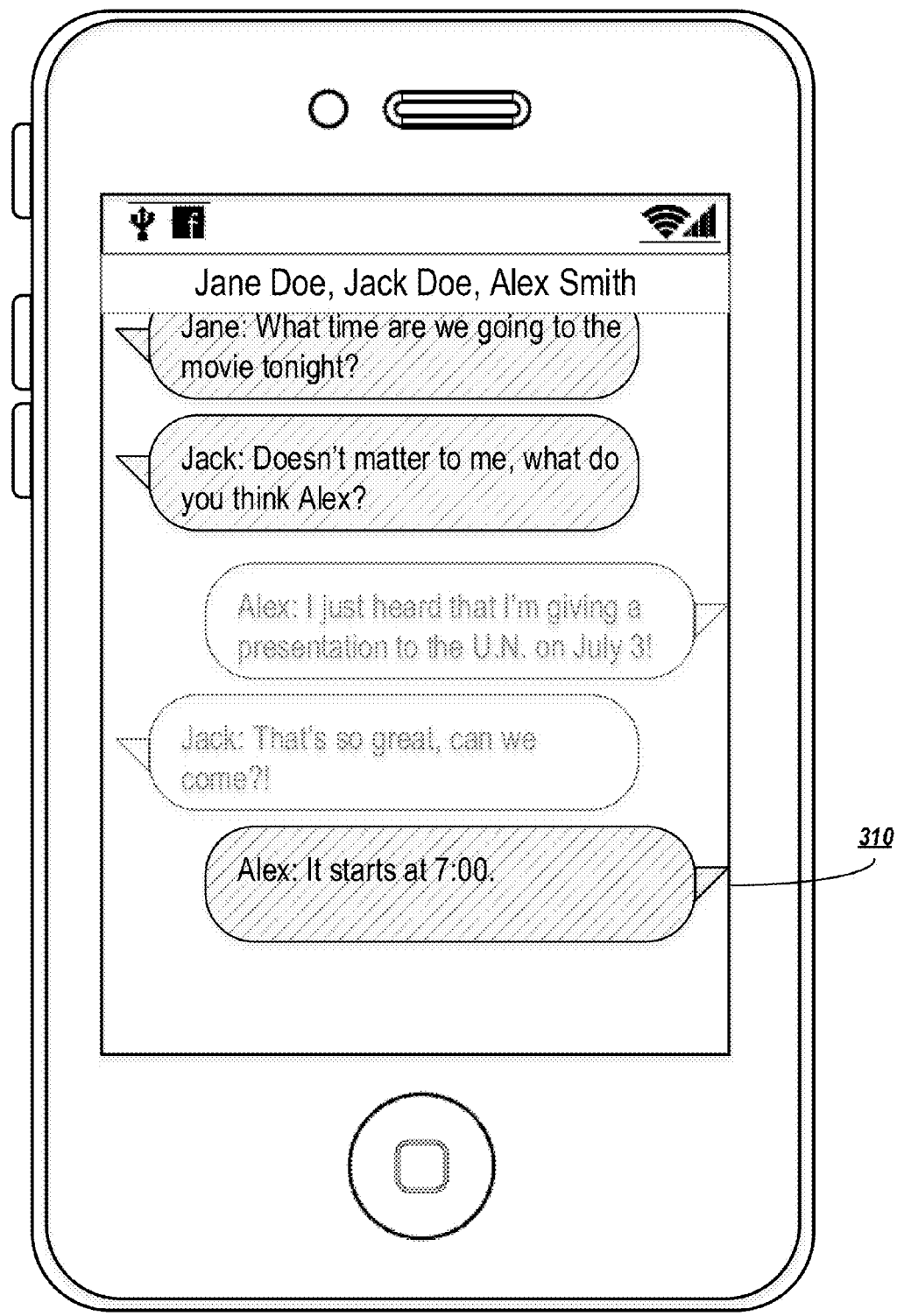
FIG. 3D depicts an example of synchronously displaying a new message in an existing thread.

In the example of FIG. 3C, the user enters a new message in a text input location 308 on the interface (although one of ordinary skill will recognize that alternative means of message entry, include speech recognition and gesture control, may also be used). The new message becomes associated with the currently in-focus thread, as shown in FIG. 3D. Thus, when the new message 310 is created, it is visually distinguished in the same manner as the other messages in the associated thread. Although FIG. 3D shows the new message 310 displayed synchronously, it is understood that the message may also be displayed asynchronously, grouped with the other messages of the associated thread. Among other possibilities, the determination as to whether to display a message synchronously or asynchronously may be made based on user preferences.

Figure 3E:
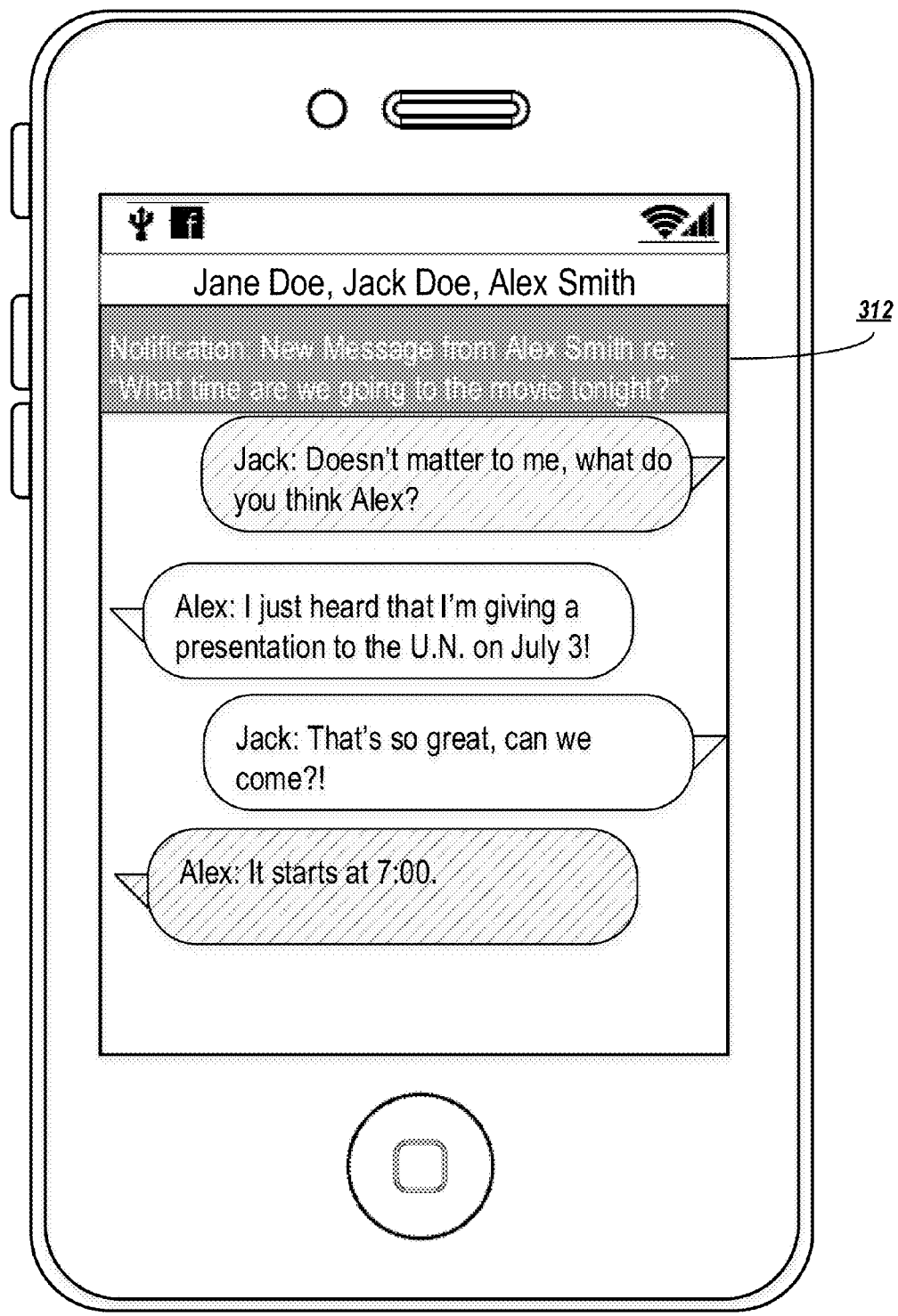
FIG. 3E depicts an example of issuing a notification for a new message in an existing thread.

As new messages are composed, participants in the group conversation may receive new message notifications or alerts 312, as shown in FIG. 3E. However, if a user is not currently interacting with one or more threads in the conversation, it may be undesirable to provide notifications for such threads. These notifications may only serve to distract the user with alerts for messages in which the user is uninterested.

Accordingly, the messaging system may determine whether a user is actively engaging with a thread before issuing an alert or notification. Active engagement may be determined, for example, by determining whether the user has sent a message on the thread, or brought the thread into focus on their messaging application, within a predetermined amount of time (e.g., in the past 20 minutes). If the user has not recently engaged with the thread and a new message is received, then the messaging system may refrain from issuing a notification, or may suppress a notification that would otherwise be issued. In some embodiments, notifications may still be presented for such threads, but to a lesser degree. For example, if a user receives a notification for every new message in a thread with which the user has recently interacted, then a thread without recent interaction might cause notifications to be issued on every tenth message, or once in a predetermined period of time (e.g., at most once in every ten minutes).

When a message causes a new thread to be created, a notification of a new thread may be issued. If the user does not interact with the new thread, then future notifications may be suppressed.

Figure 3F:
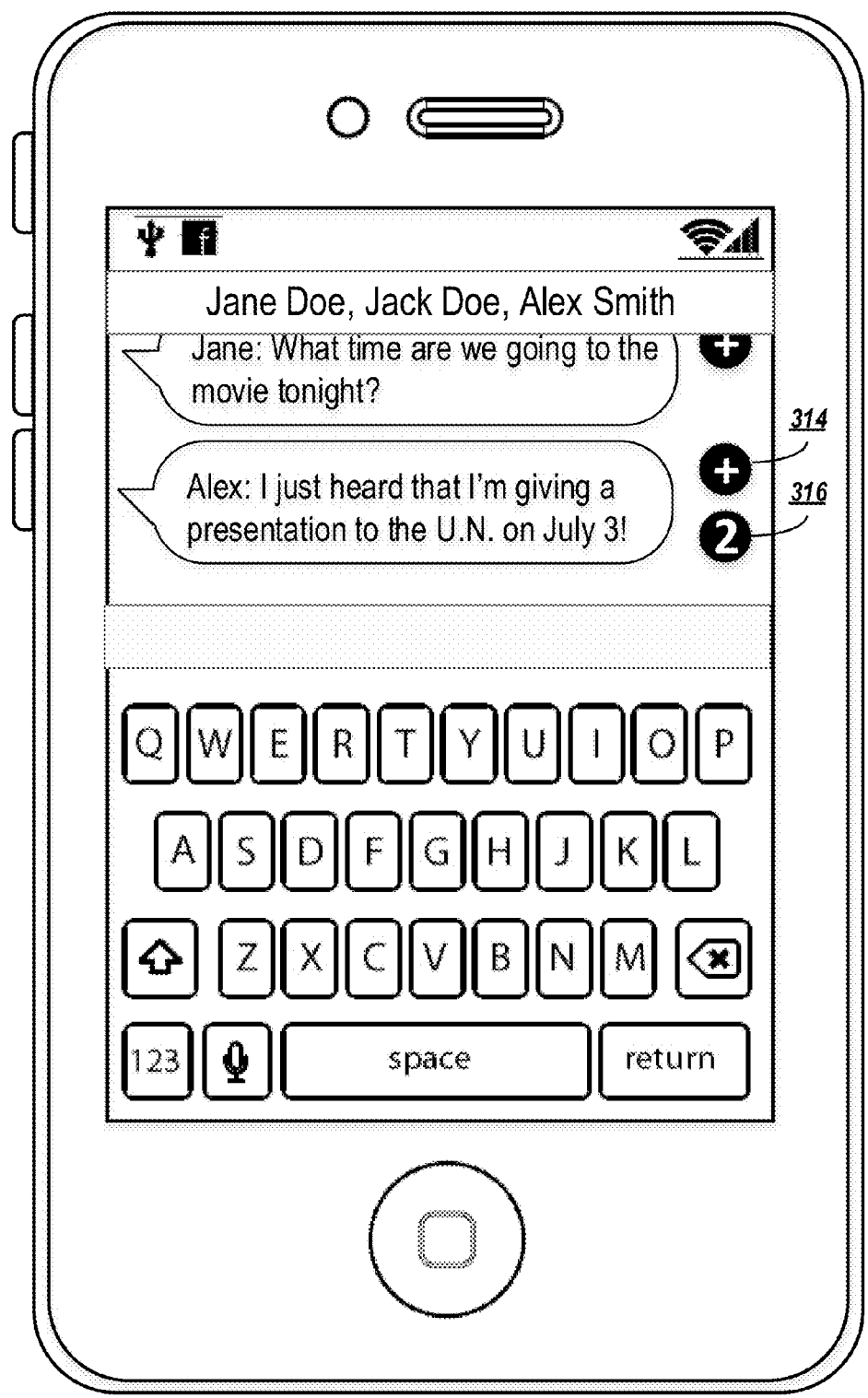
FIG. 3F depicts an example of a thread summary screen.

In some embodiments, a summary view of the threads may be displayed, as shown in FIG. 3F. The summary view may display the parent message for each thread, and/or may display multiple highlights (important messages) from the thread. Highlights of the thread may be identified in a similar manner to a parent message, and will be discussed in more detail in connection with FIG. 7.

The summary view may provide an icon or other interactive element 314 that allows the thread to be expanded. As an alternative, or in addition to, the interactive element 314, a user may expand or contract a thread using gestures. For example, a grasping or pinching gesture executed while a given thread is in focus may cause the thread to collapse down to the parent thread or list of highlights. A spreading or pinch-out gesture executed on a summary page, collapsed parent thread, or thread highlight may cause the thread to be expanded so that all messages in the thread become visible. Intermediate operations may also be executed (e.g., expanding the parent thread may cause a display of thread highlights, whereas expanding the highlights may cause all messages to be displayed, and vice versa).

The summary view may also include an indication 316 of how many new (e.g., unread) messages have recently been issued in the thread.

In an expanded view, messages may be displayed synchronously or asynchronously. Both situations may have shortcomings. For example, if a new message is displayed synchronously, then intervening messages from other threads may separate the new message from other messages in the same thread, making it difficult to follow the conversation. However, if the message is displayed asynchronously (with the other members of the thread), then the user may need to navigate between different threads as new messages are received. Particularly in the case where the user is interacting with multiple conversation threads, this may become difficult.

Figure 4A:
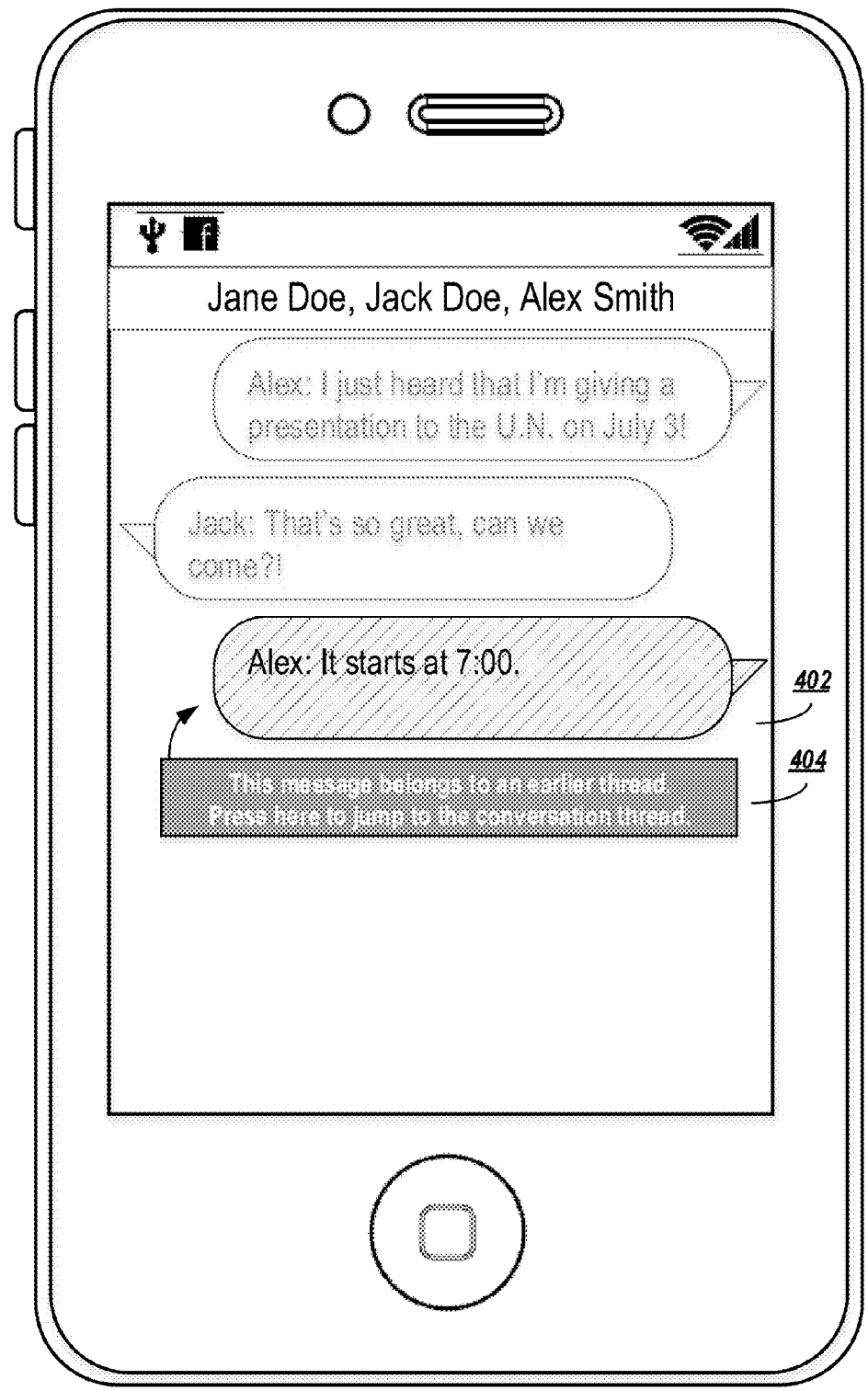
FIG. 4A depicts an example of a thread alias for redirecting an interface to an existing conversation thread.
Figure 4B:
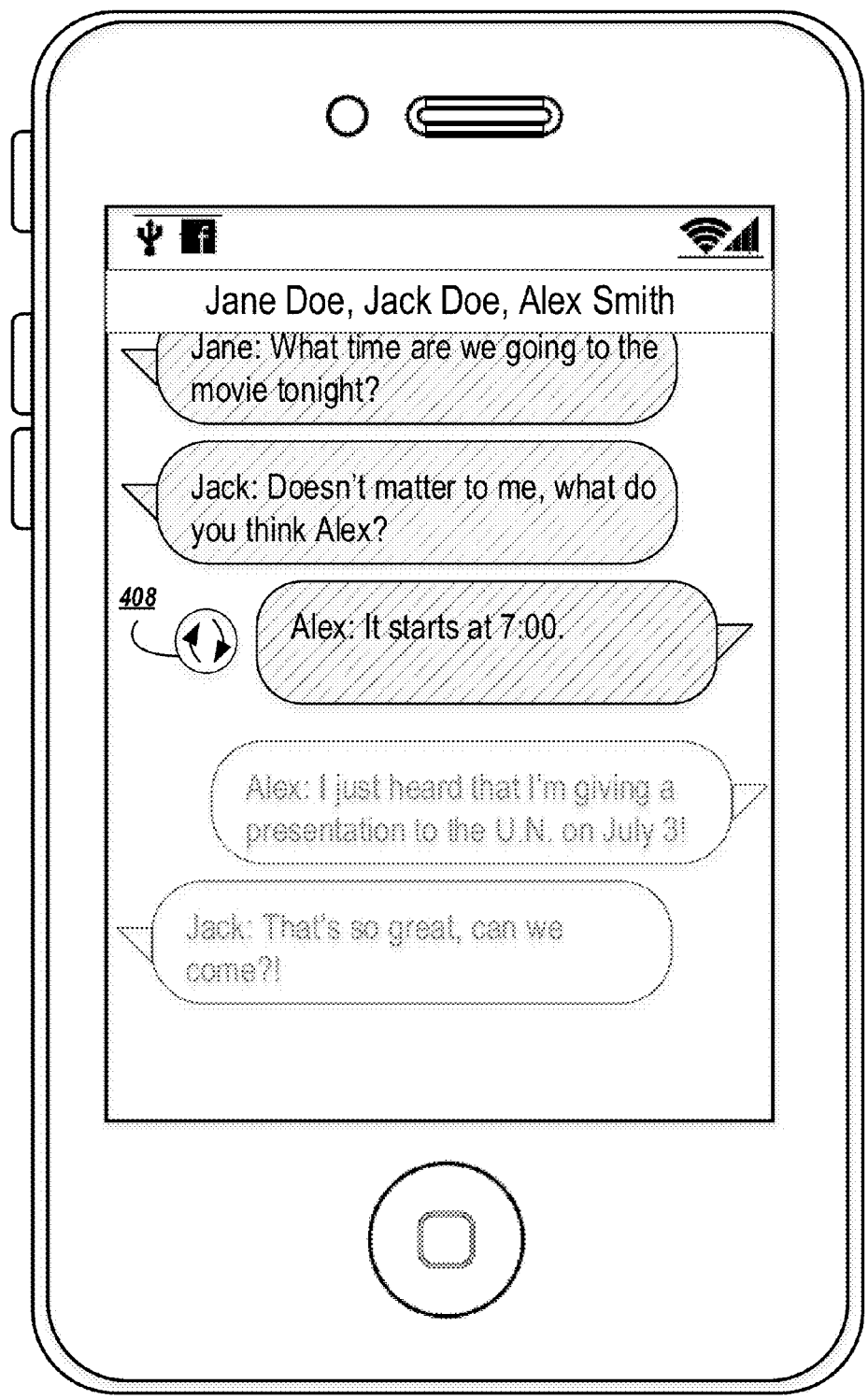
FIG. 4B depicts an example of a conversation displayed asynchronously.

Thus, according to exemplary embodiments, a message alias may be used to simplify navigation between threads. A message alias is a representation, provided in a first location, of a message that exists in a second location. For example, a new message may be displayed asynchronously with the other messages of the thread, while a message alias is displayed synchronously in the overall conversation, as shown in FIG. 4A. In this example, a synchronously displayed message alias 402 is associated with a message in a thread whose other messages have been scrolled off-screen. The alias 402 is associated with a link 404 that, when selected, causes the display to jump to the asynchronously-displayed message within the conversation thread, as shown in FIG. 4B. An icon or other interface element 408 may be displayed to indicate that the message is displayed out-of-order (as compared to the order in which all of the messages of the conversation were received).

These examples may be implemented by a messaging system that is provided either locally, at a client device, or remotely (e.g., at a remote server). FIGS. 5A-5D depict various examples of messaging systems, and are discussed in more detail below.

Messaging System Overview

FIG. 5A depicts an exemplary centralized messaging system 500, in which functionality for organizing messages asynchronously and/or using threads is integrated into a messaging server. The centralized system 500 may implement some or all of the structure and/or operations of a messaging service in a single computing entity, such as entirely within a single centralized server device 526.

The messaging system 500 may include a computer-implemented system having software applications that include one or more components. Although the messaging system 500 shown in FIG. 5A has a limited number of elements in a certain topology, the messaging system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and a message threading component 530. The messaging preferences 528 may include one or more privacy settings for one or more users and/or message threads. For example, the messaging preferences 528 may include a setting that indicates whether to display messages synchronously or asynchronously. Furthermore, the messaging preferences 528 may include one or more settings, including default settings, for the logic described herein.

The message threading component 530 may include a thread creation component 532 that is operable to create threads and/or assign messages to threads. The thread creation component 532 is discussed in more detail in connection with FIG. 7.

The message threading component 530 may further include a thread display 534 that is operable to control a display of the message client based on the threading determined by the thread creation component. The thread display component 534 is discussed in more detail in connection with FIG. 8.

The network interface 522 of the client 510 and/or the messaging server 526 may also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 5B:
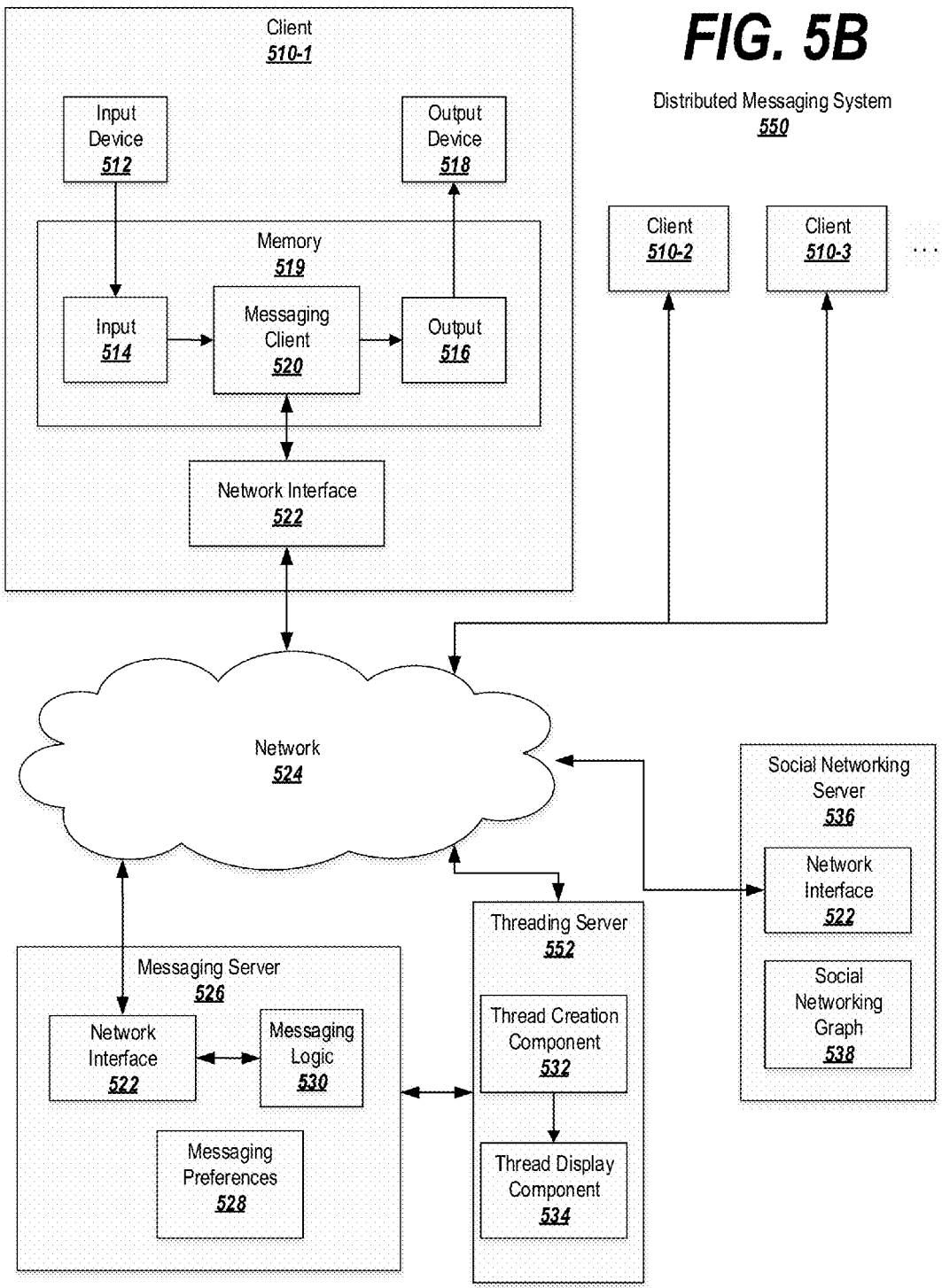
FIG. 5B is a block diagram providing an overview of a system including an exemplary distributed messaging service.

The centralized embodiment depicted in FIG. 5A may be well-suited to deployment as a new system or as an upgrade to an existing system, because the logic for pivoting to a group conversation (e.g., the logic of the intent determination component 532 and/or the logic of the group selection component 534) are incorporated into the messaging server 526. In contrast, FIG. 5B depicts an exemplary distributed messaging system 550, in which functionality for recognizing productive intent and generating a list of suggested recipients is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate threading server 552, which hosts the thread creation component 532 and the thread display component 534. The threading server 552 may be distinct from the messaging server 526 but may communicate with the messaging server 526, either directly or through the network 524, to provide the functionality of the thread creation component 532 and the thread display component 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate pivot server 552.

In still further embodiments, the thread creation component 532 and the thread display component 534 may be provided locally at the client 510-i, for example as part of the messaging client 520. In these embodiments, each client 510-$i$ makes its own determination as to which messages belong to which thread, and how to update the display and issue notifications. As a result, different clients 510-$i$ may display the same conversation differently, depending on local settings (for example, the same messages may be assigned to different threads, or similar threads may have different parents or highlights).

Figure 5D:
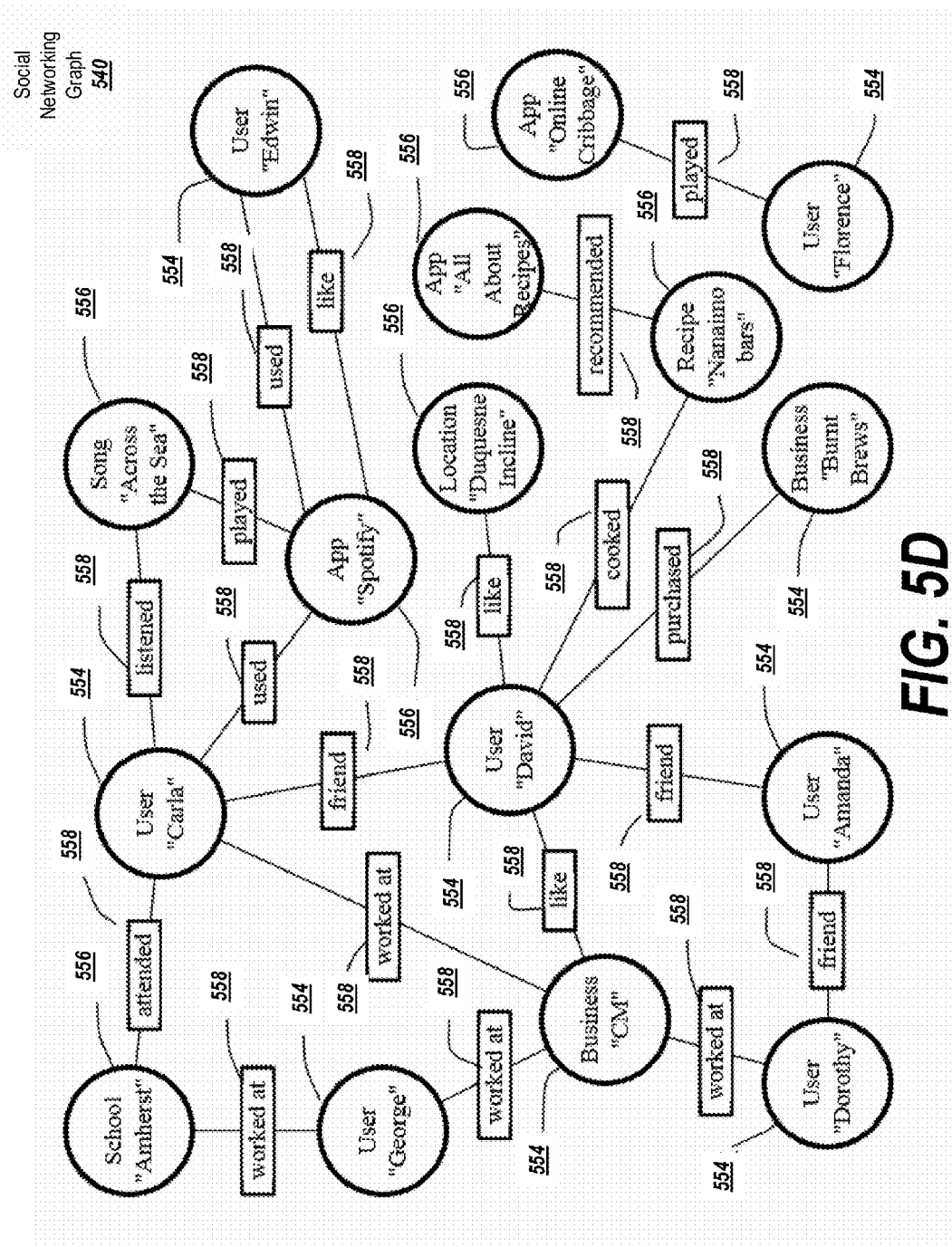
FIG. 5D depicts the social networking graph of FIGS. 5A-5C in more detail.

FIG. 5D illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5D, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5D, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5D) between user nodes 554 corresponding to the user and concept nodes 556 corresponding to the song and application to indicate that the user listened to the song and used the application. Moreover, the social-networking system may create a "played" edge 558 (as illustrated in FIG. 5D) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

Next, logic for organizing messages on a threaded basis and/or asynchronously is described.

Message Threading and Asynchronicity

Figure 6:
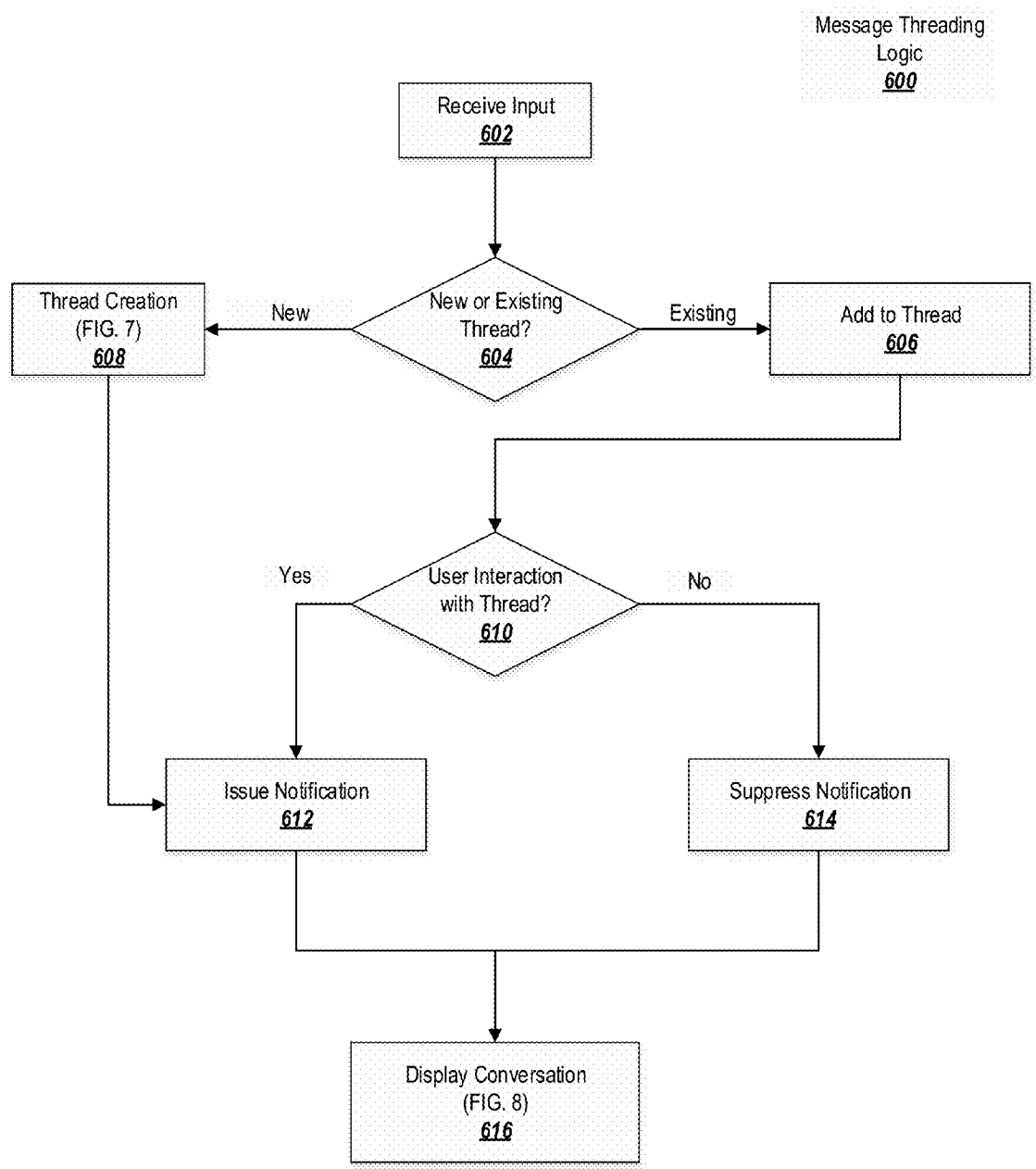
FIG. 6 is a flowchart depicting an exemplary process for processing, organizing, and displaying messages.
Figure 7:
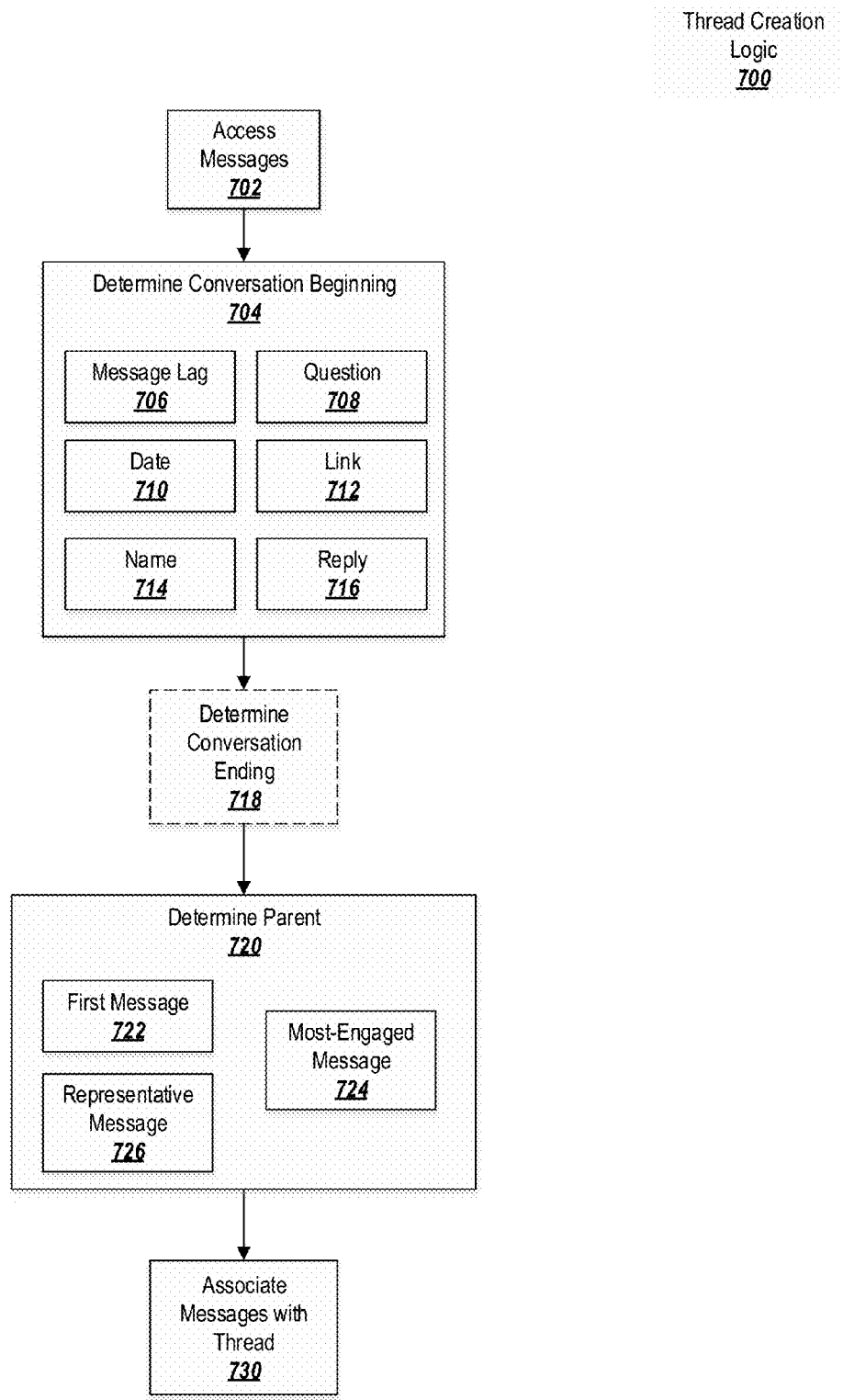
FIG. 7 is a flowchart depicting an exemplary process for creating conversational threads.
Figure 8:
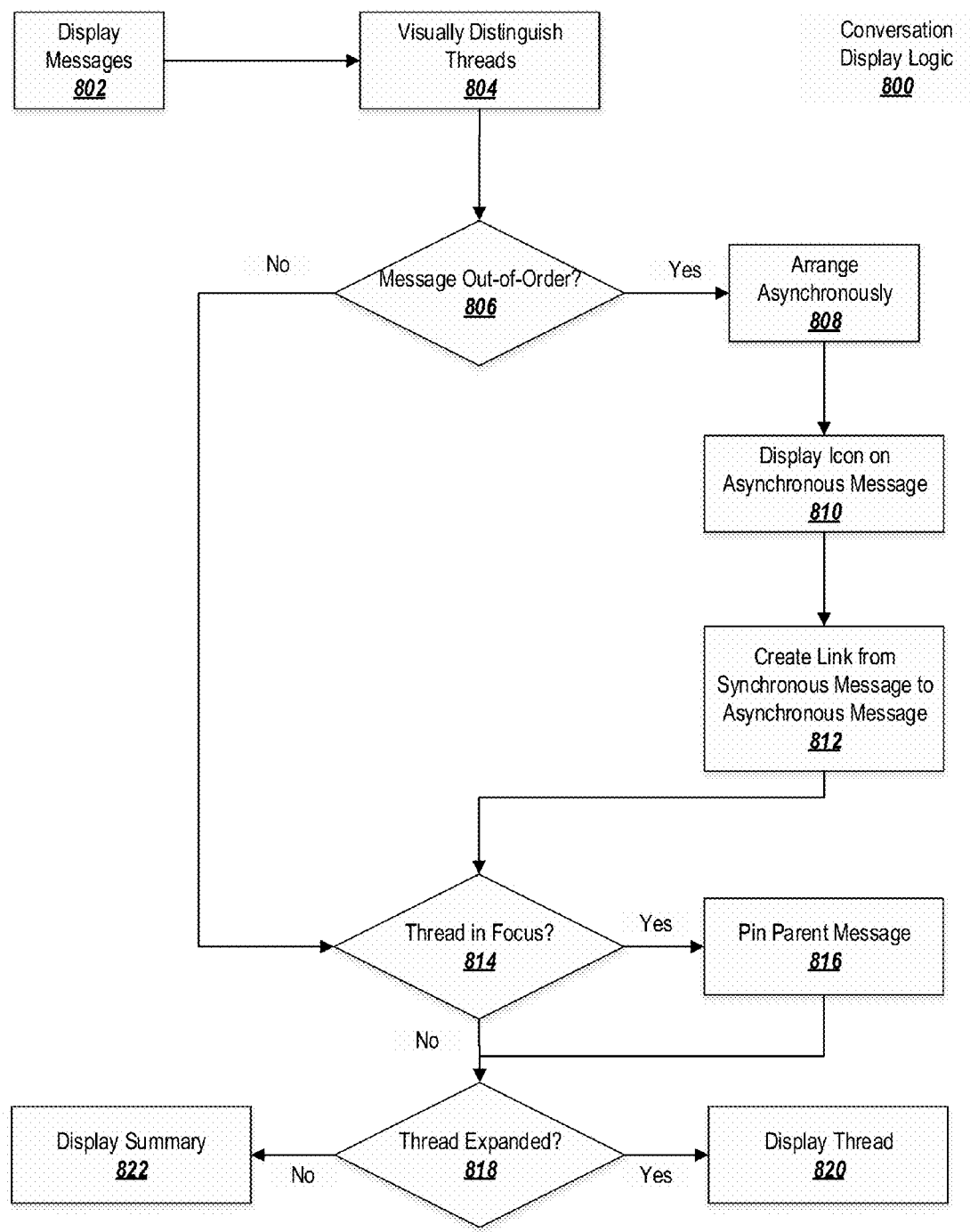
FIG. 8 is a flowchart depicting an exemplary process for displaying and navigating conversational threads.

FIGS. 6-8 are a set of flowcharts depicting exemplary logic for performing novel aspects of the disclosed architecture. While, for purposes of simplicity of explanation, the methodologies shown herein may be described as a series of acts, it is to be understood and appreciated that the methodologies are not limited by the order of acts, as some acts may occur in a different order and/or concurrently with other acts from that shown and described. For example, those skilled in the art will understand that a methodology could alternatively be represented as a series of interrelated states or events, such as in a state diagram. Moreover, not all acts illustrated may be required for an implementation.

FIG. 6 is a flowchart depicting an exemplary process performed by a client device or messaging server for organizing and displaying messages in a conversation. The process may be embodied as message threading logic 600, which may take the form of instructions that are executable by one or more processors.

At block 602, the messaging system may receive an input. For example, the input may be a new message directed to a group conversation.

At block 604, the messaging system may determine whether the input belongs to an existing thread. For example, if the input was received while a thread was in-focus (either automatically or through a manual procedure such as a user selection), the messaging system may determine that the message belongs to the existing (in-focus) thread. The system may also determine that the message belongs to an existing thread even when no thread is in-focus (or a different thread is in focus), for example by determining that the content of the message relates to an existing thread. If no thread can be found that relates to the received message, then at block 604 the system may determine that a new thread should be created.

If the determination at block 604 is that the message belongs to an existing thread, then at block 606 the system may associate the message with the existing thread. For example, the message may be assigned a thread ID that corresponds to the existing thread. Processing may then proceed to block 610, where the system may determine whether the user has recently (e.g., within a predetermined period of time) interacted with the existing thread. If so, processing proceeds to block 612 and the system issues a notification that a new message has been received. If not, then processing proceeds to block 614, and no notification is issued (e.g., a notification may be suppressed, or the system may refrain from issuing a notification).

On the other hand, if the determination at block 604 is that a new thread should be created for the message, then at block 608 the system may execute a thread creation process, as described in more detail in connection with FIG. 7. When the new thread is created, processing may proceed to block 612 and the system may issue a notification that a message on a new thread has been received.

After a decision is made regarding notifications processing proceeds to step 616 and the system updates a display of the conversation. The display update procedure is described in more detail in connection with FIG. 8.

Turning to FIG. 7, exemplary thread creation logic 700 for creating and managing threads is depicted. At block 702, the system may access the messages associated with the group conversation. For example, if the messages are stored locally in memory associated with the messaging application, then the local memory may be accessed and the messages retrieved.

At block 704, the system may determine whether one of the messages retrieved at block 702 indicates a beginning of a conversation. The beginning of a conversation may be identified based on one or more metrics.

For example, the system may evaluate a message lag metric 706. If there has been a long gap between messages (e.g., more than a predetermined threshold period of time, such as 30 minutes), then the new message may indicate that the user desires to introduce a new topic or point of conversation, and hence to start a new communication thread.

The system may determine whether one of the messages includes a question 708. The presence of a question in the message may indicate the start of a new conversation thread, as may the presence of a date 710, a link 712 (e.g., a hyperlink), or a person's name 714 (particularly the user of the local system on which the messaging logic is executing). Each of these indicators tends to introduce a concept which will be the subject of further communication. These metrics, and others, may be considered individually or in combination.

Moreover, in some cases a reply 716 to a previous message may start a new topic of conversation or thread. For example, if a question was raised in a previous thread (such that the question, by itself, was not sufficient to demarcate an entirely new conversation), then a reply to the question may trigger a further conversation on the topic of the original question or the reply. In such a case, the previous message (to which a reply was provided) may be elevated to the status of a new conversation starter.

Still further, the presence of certain keywords (e.g., "hey!") may indicate the start of a new thread.

Optionally, at block 718, the system may determine whether a message represents an end of a conversation. For example, the system may identify keywords generally associated with the end of a conversation (e.g., "bye!" or "OK" or "thanks"), or may identify the conversation end using metrics similar to hose associated with the conversation start (e.g., message lag).

Once a conversation beginning and/or ending has been identified, the system may (at block 720) determine a parent message for the thread encompassing the conversation. The parent message may be, for example, the first message 722 in the conversation. Alternatively, the parent message may be the most-engaged-with message 724. For example, if the messaging system allows users to up-vote or "like" particular messages, or to reply to specific messages, then the messages having the most up-votes, likes, or replies may be considered the most engaged-with message. Still further, the messages may be evaluated to determine a most representative message 726, such as a message containing certain keywords that are repeated in the message thread, a message to which other messages refer, etc.

At block 730, the system may associate the messages of the conversation with the threads as identified in blocks 704-720. Messages may be organized synchronously, such that a message received between the beginning and ending of a conversation is assigned to that conversation's thread. Alternatively or in addition, a message transmitted while a given thread was in-focus may be assigned to that thread. Threads may be associated with a thread ID, and messages may be transmitted with the tread ID that was currently in focus at the time the message was sent, so that receiving messaging systems can identify which thread the originating messaging system associated with the message.

Turning to FIG. 8, exemplary conversation display logic 800 is now described.

At block 802, the system displays one or more messages of the conversation. At block 804, the system checks the thread IDs associated with the messages, and visually distinguishes different message threads in different ways. For example, different colors may be assigned to different threads, different typefaces may be employed, etc.

At block 806, the system determines whether any messages are flagged to a particular thread, but placement in that thread would place the message out-of-order with respect to other messages in the conversation. If not, then all messages are displayed synchronously and processing proceeds to block 814. If so, then processing proceeds to step 808 and the messages are displayed asynchronously. For example, the messages within a given thread may be displayed in the order received, and the threads may be arranged in a particular order (e.g., chronologically based on a timestamp associated with their parent thread, or based on the timestamp of the most recent message in the thread, etc.).

Processing may then proceed to block 810, where an identifier or icon may be displayed on or near any messages that are displayed out-of-order. Furthermore, at block 812, one or more message aliases may be created and displayed in a synchronous manner with respect to the overall conversation. A link may be created that links from the message alias to the asynchronously-displayed message. Processing may then proceed to block 814.

At block 814, the system may determine whether any thread is currently in focus (e.g., a thread has been manually selected, or has been automatically focused due to user scrolling). If so, then processing may proceed to block 816, and the system may pin the parent message of the thread to a predetermined location. If not, then processing proceeds to block 818.

At block 818, the system determines whether each of the threads has been expanded. If so, then at block 820 all of the messages of the thread are made available for the display. If not, then at block 822 a summary of the thread (e.g., the thread's parent message and/or any thread highlights) may be made available for display.

Using the exemplary embodiments described above, message threading and/or asynchronous techniques may be introduced to traditionally synchronous communication. This provides a number of advantages, including clarity of communication, simpler message navigation, and better message organization.

Messaging Architecture

Figure 9:
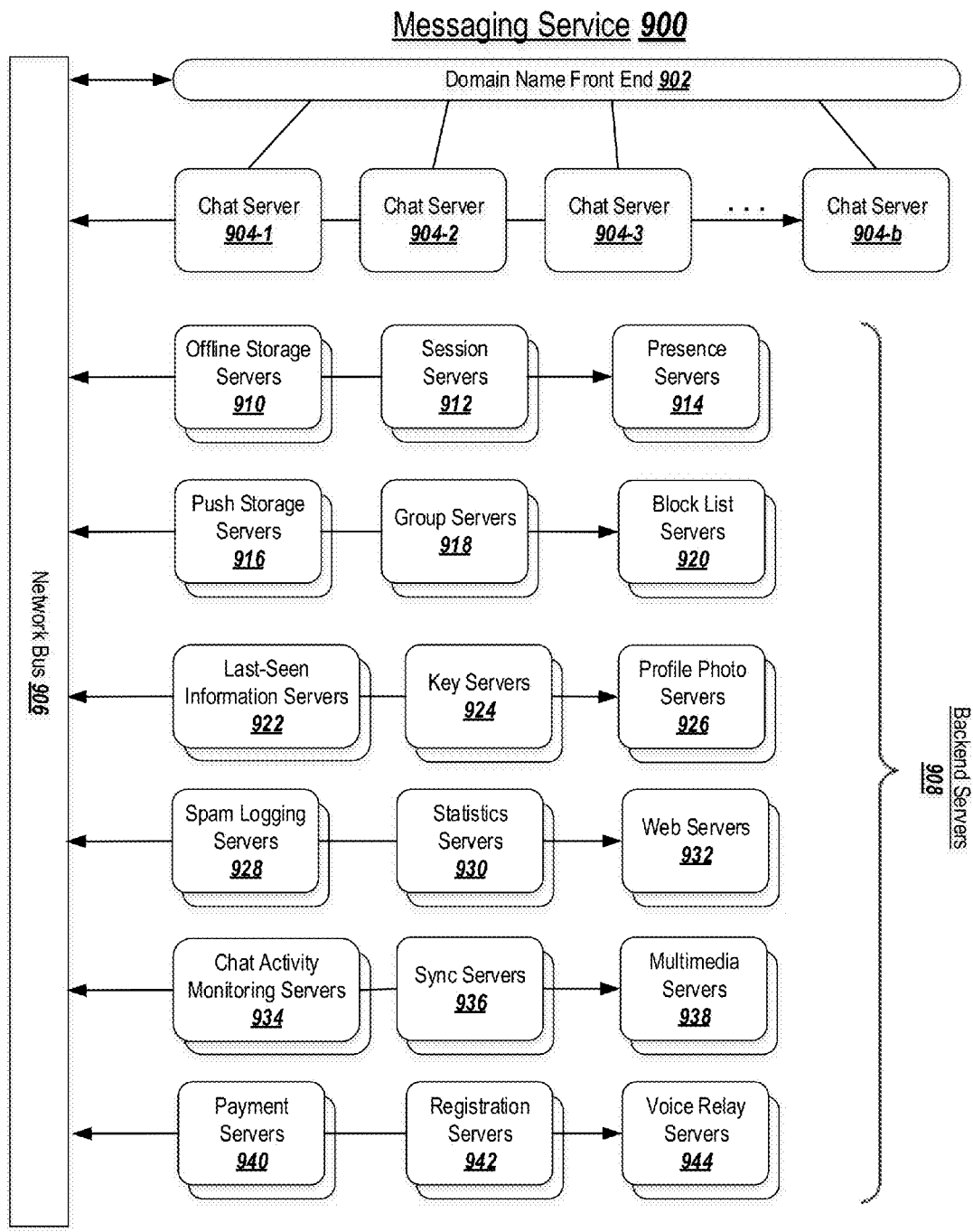
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
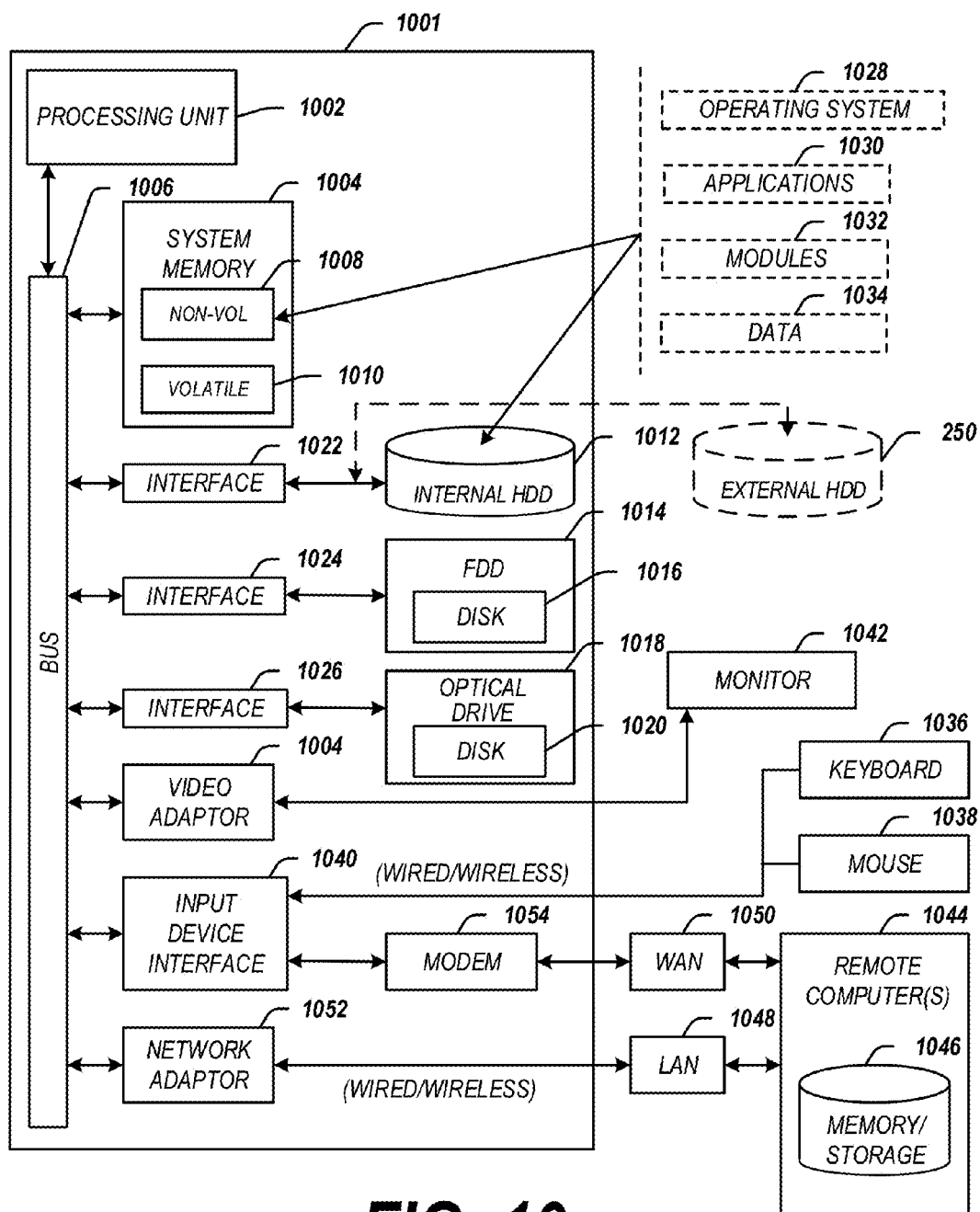
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
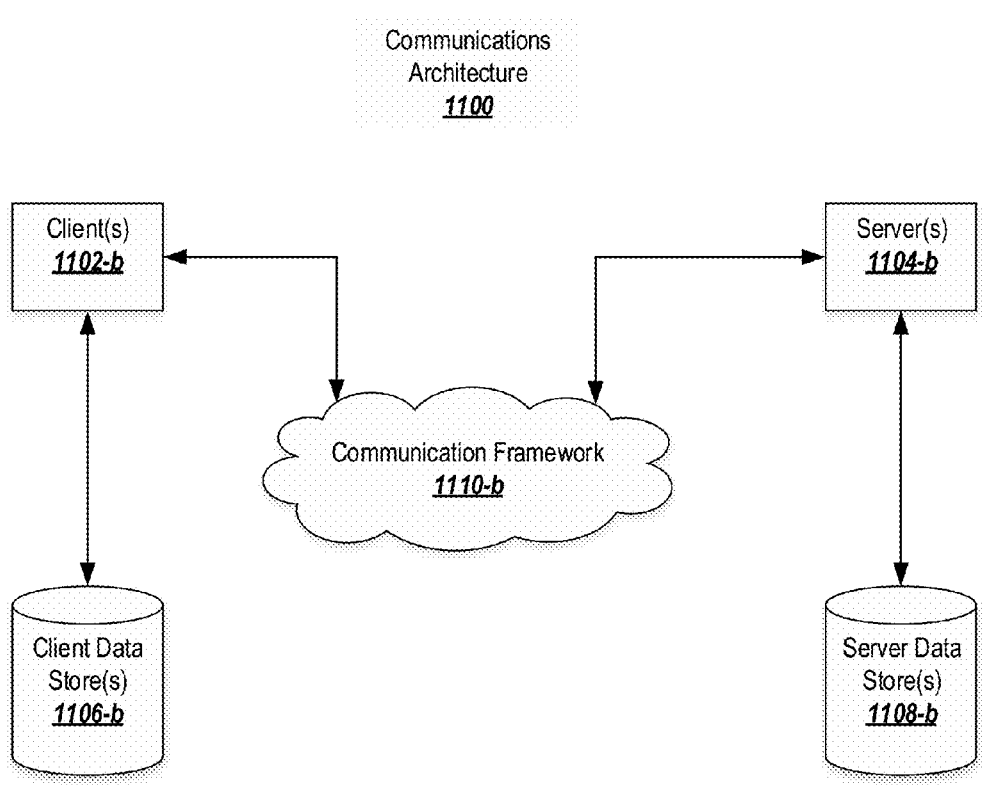
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
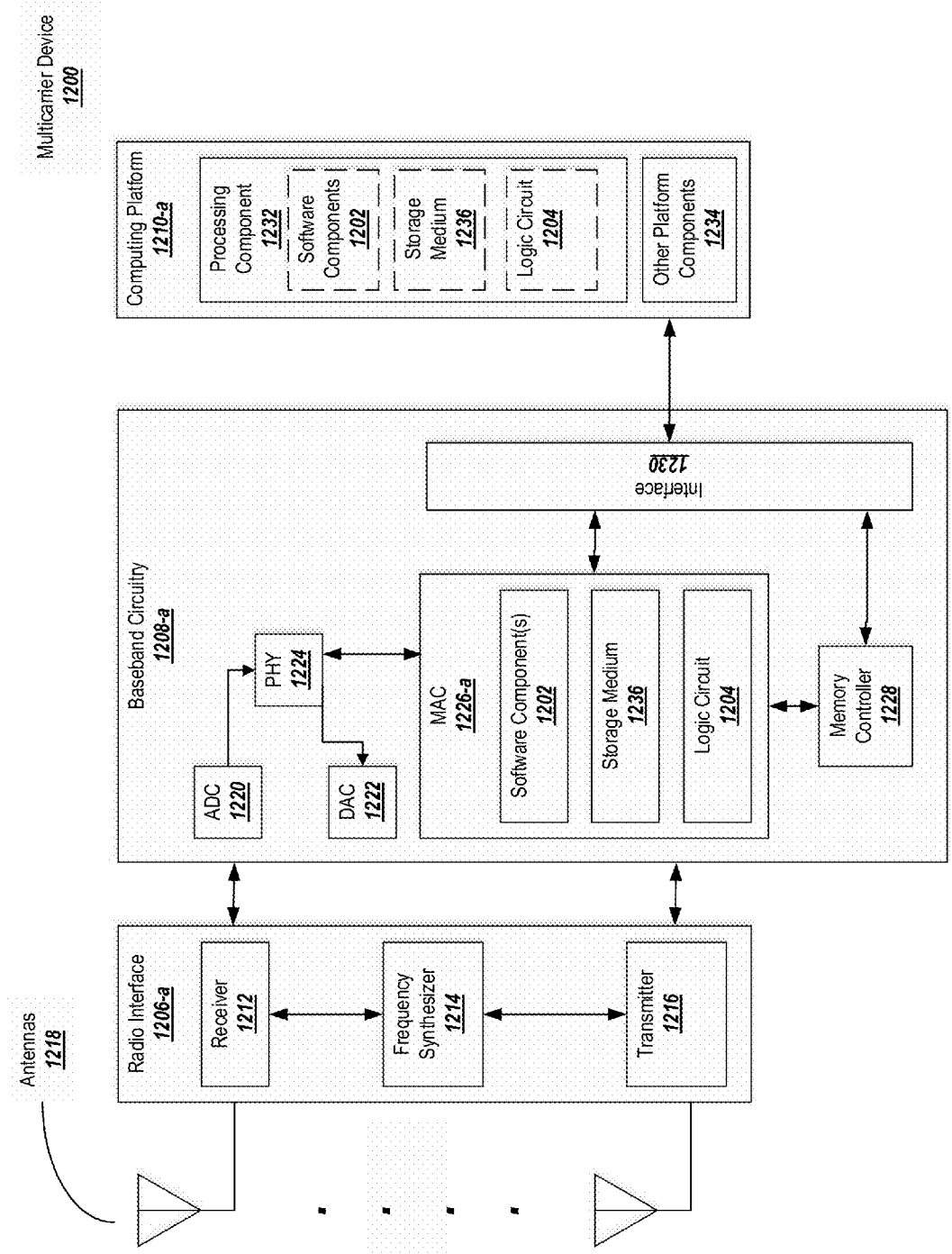
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   accessing a plurality of messages of a group conversation at a messaging system, the plurality of messages received in a synchronous order and associated with a synchronous ordering representing the synchronous order in which the messages were received;
   identifying a subset of the plurality of messages associated with a conversation thread within the group conversation;
   determining an asynchronous order for the plurality of messages based at least in part on whether a message of the plurality of messages is within the identified subset of messages, the asynchronous order differing from the synchronous order; and
   rearranging the synchronous ordering to display the plurality of messages of the group conversation in accordance with the asynchronous order, the asynchronous order resulting in a grouping of the identified subset of the plurality of messages within the plurality of messages of the group conversation.

2. The method of claim 1, further comprising:
   identifying an asynchronous message in the conversation thread;
   creating a message alias at a synchronous location corresponding to where the asynchronous message would be displayed in the group conversation if the group conversation were arranged synchronously; and
   creating a link in the message alias that causes a display to be redirected from the synchronous location to the asynchronous message.

3. The method of claim 2, further comprising displaying an indication that the asynchronous message is arranged out of order.

4. The method of claim 1, further comprising:
   receiving a command to scroll through the messages of the group conversation;
   identifying when a majority of messages on a display are associated with the conversation thread; and
   causing the messages of the conversation thread to become focused in response to the identifying.

5. The method of claim 4, further comprising:
   identifying a parent message associated with conversation thread; and
   displaying the parent message in a predetermined location on a display.

6. The method of claim 4, further comprising:
   receiving an instruction to transmit a new message while the conversation thread is focused; and
   adding the new message to the conversation thread.

7. The method of claim 1, further comprising:
   receiving a gesture, the gesture being:
     a summary gesture that causes one or more highlights of the conversation thread to be displayed while suppressing display of other messages of the conversation thread, or an expand gesture that expands the conversation thread to make all messages of the conversation thread accessible.

8. A non-transitory computer-readable medium storing instructions configured to cause one or more processors to:
cause messaging logic to access a plurality of messages of a group conversation at a messaging system, the plurality of messages received in a synchronous order and associated with a synchronous ordering representing the synchronous order in which the messages were received;
cause threading logic to identify a subset of the plurality of messages associated with a conversation thread within the group conversation;
cause the threading logic to determine an asynchronous order for the plurality of messages based at least in part on whether a message of the plurality of messages is within the identified subset of messages; and
cause display logic to rearrange the synchronous ordering to display the plurality of messages of the group conversation in accordance with the asynchronous order, the asynchronous order resulting in a grouping of the identified subset plurality of messages within the plurality of messages of the group conversation.

9. The medium of claim 8, further storing instructions to:
identify an asynchronous message in the conversation thread;
create a message alias at a synchronous location corresponding to where the asynchronous message would be displayed in the group conversation if the group conversation were arranged synchronously; and
create a link in the message alias that causes a display to be redirected from the synchronous location to the asynchronous message.

10. The medium of claim 9, further storing instructions to display an indication that the asynchronous message is arranged out of order.

11. The medium of claim 8, further storing instructions to:
receive a command to scroll through the messages of the group conversation;
identify when a majority of messages on a display are associated with the conversation thread; and
cause the messages of the conversation thread to become focused in response to the identifying.

12. The medium of claim 11, further storing instructions to:
identify a parent message associated with conversation thread; and
display the parent message in a predetermined location on a display.

13. The medium of claim 11, further storing instructions to:
receive an instruction to transmit a new message while the conversation thread is focused; and
add the new message to the conversation thread.

14. The medium of claim 8, further storing instructions to:
receive a gesture, the gesture being:
a summary gesture that causes one or more highlights of the conversation thread to be displayed while suppressing display of other messages of the conversation thread, or
an expand gesture that expands the conversation thread to make all messages of the conversation thread accessible.

15. An apparatus, comprising:
a processing circuit;
a display device; and
a non-transitory medium configured to store:
a plurality of messages of a group conversation, the plurality of messages associated with a synchronous order and associated with a synchronous ordering representing the synchronous order in which the messages were received,
computer-executable instructions that, when executed by the processing circuit, cause the processing circuit to:
identify a subset of the plurality of messages associated with a conversation thread within the group conversation;
determine an asynchronous order for the plurality of messages based at least in part on whether a message of the plurality of messages is within the identified subset of messages; and
rearrange the synchronous ordering to display the plurality of messages of the group conversation in accordance with the asynchronous order on the display device, the asynchronous order resulting in a grouping of the identified subset of the plurality of messages within the plurality of messages of the group conversation.

16. The apparatus of claim 15, wherein the threading logic is further configured to:
identify an asynchronous message in the conversation thread;
create a message alias at a synchronous location corresponding to where the asynchronous message would be displayed in the group conversation if the group conversation were arranged synchronously; and
create a link in the message alias that causes a display to be redirected from the synchronous location to the asynchronous message.

17. The apparatus of claim 15, further comprising an interface configured to:
receive a command to scroll through the messages of the group conversation;
identify when a majority of messages on a display are associated with the conversation thread; and
cause the messages of the conversation thread to become focused in response to the identifying.

18. The apparatus of claim 17, wherein the interface is further configured to:
identify a parent message associated with conversation thread; and
cause the display to display the parent message in a predetermined location on a display.

19. The apparatus of claim 17, wherein the computer-executable instructions further cause the processing circuit to receive an instruction to transmit a new message while the conversation thread is focused, and to add the new message to the conversation thread.

20. The apparatus of claim 15, further comprising an interface configured to receive a gesture, the gesture being:
a summary gesture that causes one or more highlights of the conversation thread to be displayed while suppressing display of other messages of the conversation thread, or
an expand gesture that expands the conversation thread to make all messages of the conversation thread accessible.

* * * * *